United States Patent
Duclos et al.

(10) Patent No.: US 6,298,113 B1
(45) Date of Patent: Oct. 2, 2001

(54) SELF ALIGNING INTER-SCINTILLATOR REFLECTOR X-RAY DAMAGE SHIELD AND METHOD OF MANUFACTURE

(75) Inventors: Steven Jude Duclos; Jacob Charles Bortscheller, both of Clifton Park, NY (US); George William Taylor, Oak Creek; Christopher Jay Morse, Mukwonago, both of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/499,323

(22) Filed: Feb. 7, 2000

(51) Int. Cl.[7] .................................................. G01T 1/20
(52) U.S. Cl. ............................. 378/19; 250/367; 250/368
(58) Field of Search .................................. 250/368, 367; 427/160; 378/19, 98.8

(56) References Cited

U.S. PATENT DOCUMENTS

| | | | |
|---|---|---|---|
| 5,127,030 | 6/1992 | Annis et al. ........................ | 378/150 |
| 5,187,369 * | 2/1993 | Kingsley et al. ................ | 250/370.11 |
| 5,712,483 * | 1/1998 | Boone et al. ...................... | 250/367 |
| 5,956,382 * | 9/1999 | Wiener-Avnear et al. ........ | 378/98.8 |

OTHER PUBLICATIONS

S. Wolf et al., "Silicon Processing for the VLSI Era, Vol. 1: Process Technology", Chapters 12–14, (Lattice Press 1986).

* cited by examiner

Primary Examiner—David P. Porta
Assistant Examiner—Jurie Yun
(74) Attorney, Agent, or Firm—Noreen C. Johnson; Douglas E. Stoner

(57) ABSTRACT

A scintillator pack including an x-ray damage shield. The scintillator pack has an array of scintillator pixels. A scintillation light reflecting layer that reflects scintillation light from the pixels is included at least between the scintillator pixels in inter-scintillator regions. An x-ray absorbing layer acts as the x-ray damage shield to protect the portions of the scintillation light reflecting layer from x-rays. The x-ray absorbing layer is formed selectively and in a self aligned manner in regions over the inter-scintillator regions.

48 Claims, 15 Drawing Sheets

SELF ALIGNING INTER-SCINTILLATOR REFLECTOR X-RAY DAMAGE SHIELD AND METHOD OF MANUFACTURE

BACKGROUND OF THE INVENTION

This invention relates generally to an x-ray damage shield and a method of manufacturing the shield. More particularly, it relates to a self aligning x-ray damage shield for protecting an inter-scintillator reflector and a method of manufacturing such a shield.

Solid state detectors for computed tomography (CT) imaging use scintillators to convert x-rays into scintillation light which itself is converted to an electrical signal with a photodiode. Detector arrays are typically comprised of scintillator pixels separated by a reflecting material used to pipe the scintillation light towards the diode. Scintillator thicknesses and pixel widths required by such detectors result in aspect ratios (the ratio of the height to width of a pixel) such that on average, the scintillation light reflects off the reflecting material several times before exiting to the diode. For this reason, the materials useful as a reflector are limited to materials that are highly reflecting at the scintillation light wavelengths emitted by the scintillator.

Appropriate reflector materials include high refractive index solid materials such as $TiO_2$ formed in a castable low index medium such as an epoxy. One drawback of such a system is the darkening of the epoxy matrix when it is struck by a dose of x-rays commonly used in CT imaging. A typical dose over the life of the detector is 1 Mrad. This darkening results in lower reflectivity and less efficient collection of the scintillation light, and thus a lowering of the sensitivity of the x-ray detector.

Furthermore, the darkening is often not uniform over the entrance face of the detector. This lack of uniformity in darkening can result in image degradation if the detector is not properly calibrated. In addition to the reflector material itself, the diode below the reflector is also sensitive to radiation and must be protected from the x-ray beam.

Current CT detectors use a collimator assembly to protect the reflector epoxy material from damage by x-rays. This assembly consists of tall tungsten plates aligned perpendicular to the plane of the x-ray fan beam. This assembly is primarily used to minimize scattered x-rays from reaching the scintillator, but is also used to protect the reflector material between pixels from the x-rays. For multi-slice CT, where the detector is segmented in the direction parallel to the fan beam, wires are used to protect the reflector and diodes. These wires are strung between the deep plates in grooves machined in the plates.

The manufacturing of such a two dimensional collimator with plates and wires is complex. The separate construction of the collimator with protective wires and the scintillator/ reflector body requires accurate alignment of these devices during construction of the complete detector. This alignment cannot be done optically since the reflector material between the scintillator pixels ("interscintillator reflector") is obscured by reflector material covering the top of the pixels ("surface reflector"). Therefore, either x-ray alignment or rigorous dimensional tolerances must be used to ensure that the reflector material is aligned with the protective wires.

BRIEF SUMMARY OF THE INVENTION

In view of the foregoing, it would be desirable to provide a scintillator pack including a scintillator pixel array, inter-scintillator reflector, and x-ray absorbing layer that avoids or reduces the above mentioned problems.

In accordance with one aspect of the present invention, there is provided a scintillator pack. The scintillator pack includes an array of scintillator pixels, a scintillation light reflecting layer for reflecting scintillation light from the scintillator pixels, where the scintillation light reflecting layer is formed in inter-scintillator regions between the scintillator pixels, and an x-ray absorbing layer comprising a high density x-ray absorbing material formed selectively in first regions over the inter-scintillator regions. Preferably the high density material is formed in a self-aligned manner. The scintillation light reflection layer may cover a top surface of the scintillator pixels.

In accordance with another aspect of the present invention there is provided a method of forming a scintillator. According to this aspect of the invention the method comprises forming a scintillation light reflecting layer in inter-scintillator regions between scintillator pixels of an array of scintillator pixels, and selectively forming an x-ray absorbing layer over the inter-scintillator regions.

According to this aspect of the invention the method may further comprise forming an x-ray absorbing precursor layer over the array of scintillator pixels and inter-scintillator regions, selectively exposing the x-ray absorbing precursor layer to radiation thereby forming first precursor regions selectively over and self aligned to the inter-scintillator regions, and second precursor regions between the first precursor regions, and removing the second precursor regions.

According to this aspect of the invention the method may alternatively further comprise forming a photoresist layer over the array of scintillator pixels and inter-scintillator regions, selectively exposing the photoresist layer to radiation thereby forming first resist regions selectively over the inter-scintillator regions, and second resist regions between the first resist regions, removing the first resist regions formed selectively over the inter-scintillator regions and leaving the second resist regions, forming an x-ray absorbing material over the second resist regions and the inter-scintillator regions, and removing the second resist regions to selectively form the x-ray absorbing layer over the inter-scintillator regions.

According to this aspect of the invention the method may alternatively further comprise forming a photoresist layer over the array of scintillator pixels and inter-scintillator regions, selectively exposing the photoresist layer to radiation thereby forming first resist regions selectively over the inter-scintillator regions, and second resist regions between the first resist regions, selectively exposing the photoresist layer to radiation thereby forming first resist regions selectively over the inter-scintillator regions, and second resist regions between the first resist regions, removing the first resist regions formed selectively over the inter-scintillator regions and leaving the second resist regions, forming a first layer of x-ray absorbing material over the second resist regions and the inter-scintillator regions by one of plating, chemical vapor deposition, sputtering, and evaporation, removing the second resist regions, and optionally forming a second layer of x-ray absorbing material of x-ray absorbing material on the remaining first layer of x-ray absorbing material by one of plating and solder to thereby selectively form the x-ray absorbing layer over the inter-scintillator regions.

In accordance with another aspect of the present invention, there is provided a scintillator pack comprising an array of scintillator pixels, a scintillation light reflecting layer for reflecting scintillation light from the scintillator pixels, where the scintillation light reflecting layer is formed in inter-scintillator regions between the scintillator pixels, and an alignment layer formed selectively in a self aligned manner in first regions over the inter-scintillator regions. The scintillator pack may include an x-ray protection shield formed over and aligned to the alignment layer.

In accordance with another aspect of the present invention, there is provided a method of forming a scintillator pack comprising forming a scintillation light reflecting layer in inter-scintillator regions between scintillator pixels of an array of scintillator pixels, and selectively forming an alignment layer over the inter-scintillator regions. According to this aspect of the invention the method may further comprise forming an x-ray shield over and aligned to the alignment layer. According to this aspect of the invention, the selectively forming step may further comprise forming a radiation curable layer over the array of scintillator pixels and inter-scintillator regions, selectively exposing the radiation curable layer to radiation thereby forming first regions selectively over and self aligned to the interscintillator regions, and second regions between the first regions, and removing the second regions.

In accordance with another aspect of the present invention there is provided a computed tomography system comprising an x-ray source, a scintillator pack including an array of scintillator pixels, a scintillation light reflecting layer formed in inter-scintillator regions between the scintillator pixels for reflecting scintillation light from the scintillator pixels upon an x-ray from the x-ray source impinging upon one of the scintillator pixels, and an x-ray absorbing layer comprising a high density x-ray absorbing material formed selectively in a self aligned manner in first region over the inter-scintillator regions, and a scintillation light detector optically coupled to the solid scintillator material for detecting the scintillation radiation.

DETAILED DESCRIPTION OF THE INVENTION

Figure 1:
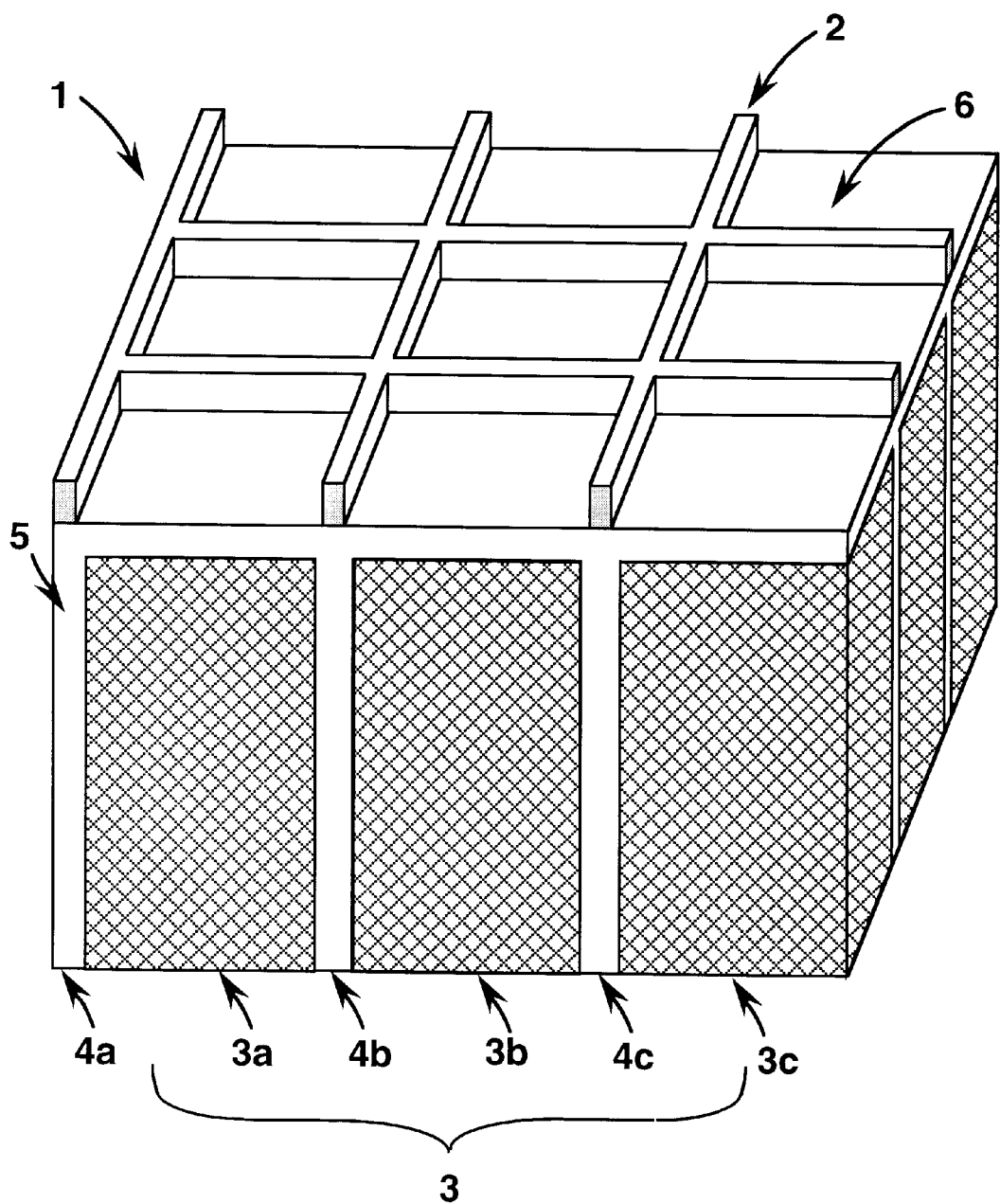
FIG. 1 is a scintillator pack including an x-ray damage shield according to an embodiment of the present invention.

FIG. 1 is a scintillator pack 1 including an x-ray absorbing layer 2, which acts as an x-ray damage shield, according to a first embodiment of the present invention. The scintillator pack 1 includes an array 3 of scintillator pixels 3a, 3b, 3c, etc. FIG. 1 shows only a fraction of the scintillator pack for ease of illustration, and in general, the array 3 will include many more pixels than those shown in the Figure. The scintillator pack I further includes inter-scintillator regions 4a, 4b, 4c, etc. filled with scintillation light reflecting material of a scintillation light reflecting layer 5. The scintillation light reflecting layer 5 may also extend over the top of the scintillator pixels forming a surface reflector layer 6 portion of the reflecting layer 5.

In FIG. 1, the array 3 is a two-dimensional array. However, the array may also be one-dimensional. Preferably the two-dimensional array contains a square or rectangular cross-sectioned scintillator pixels, with the x-ray absorbing layer 2 having a grid pattern with shielding lines directly over the inter-scintillator regions 4a, 4b, 4c, etc. In the case of a one-dimensional array, the shielding lines of the x-ray absorbing layer 2 will also be directly over the inter-scintillator regions.

In FIG. 1, the x-ray absorbing layer 2, which acts as an x-ray damage shield, is formed directly on the scintillation light reflecting material. However, it may be desirable to include one or more layers between the x-ray absorbing layer 2 and the scintillation light reflecting material. For example, depending on the scintillation light reflecting material, the x-ray absorbing layer material, and the method of depositing the x-ray absorbing layer material, it may be desirable to include an adhesion or nucleation layer or layers between the scintillation light reflecting layer 5 and the x-ray absorbing layer 2.

The scintillator material of the scintillator pixels may be any appropriate x-ray scintillator material. Appropriate scintillator host materials include, for example, gadolinium gallium garnet, gadolinium scandium gallium garnet, gadolinium scandium aluminum garnet, lutetium aluminum garnet, yttrium gallium garnet, ytrrium gadolinium oxide, $(Y, Gd)_2O_3$, $Gd_2O_2S$, CsI;Tl, CsI, lutetium orthosilicate.

The scintillation light reflecting material will depend upon the wavelength of the light emitted by the scintillator. For example, in the case of visible scintillation radiation, the scintillation light reflecting material could be a high refractive index solid such as $TiO_2$ in a castable low index medium such as an epoxy. Silver and gold plated pressure sensitive adhesives and multilayer dielectric stacks can also be used as scintillation light reflectors.

The x-ray absorbing layer material preferably includes a high density material with good x-ray absorbing properties. Examples of preferred high density materials include high density metals such as hafnium, tantalum, tungsten, rhenium, platinum, gold, lead, and alloys of these metals. Other preferred high density materials include high density compounds, such as hafnium oxide or tungsten oxide.

The x-ray absorbing layer may comprise only high density x-ray absorbing material. Alternatively, the x-ray absorbing layer may be a composite material which comprises both high density x-ray absorbing materials and other materials. In any case, the composite material should have good x-ray absorbing properties. For example, the x-ray absorbing layer may be a composite material including an epoxy matrix filled with high density particles. The high density particles preferably include high density metal particles, such as hafnium, tantalum, tungsten, rhenium, platinum, gold, lead, and alloys of these metals. Other appropriate materials include high density compounds such as hafnium oxide or tungsten oxide. In the case that composite materials are used for the x-ray absorbing layer, mixtures of these materials may be used to optimize the x-ray stopping power of the shielding lines, as well as to control the cured thickness of the filled epoxy.

The thickness of the x-ray absorbing layer 2 will depend upon the x-ray absorbing material chosen, and the x-ray energy to be used in operation for the scintillator pack 1. In general, for an x-ray absorbing material with a greater density the thickness of the x-ray absorbing layer may be less than for a material with a lesser density. Also, the thickness of the x-ray absorbing layer should be greater for higher energy x-rays than for lower energy x-rays. Preferred thicknesses of the x-ray absorbing layer range from 0.0001 to 0.080 inches thick.

The width of the shielding lines of the x-ray absorbing layer should be sufficient to protect the scintillation light reflecting material in the underlying inter-scintillator regions from x-rays. Thus, the shielding line widths should generally be the same as or larger than the width of the underlying inter-scintillator regions, 4a, 4b, 4c, etc. Preferably, these widths will range from 0.002 to 0.010 inches.

In use, each scinitillator pixel of the scintillator pack is optically coupled to a photodetector (not shown), such as a photodiode. Each scintillator pixel may be coupled to its corresponding photodetector simply by placing the bottom of the scintillator pixel adjacent to its corresponding photodetector. Alternatively, the scintillation light might be piped from the scintillator pixel to its corresponding photodetector via a fiber optic.

Figure 2A:
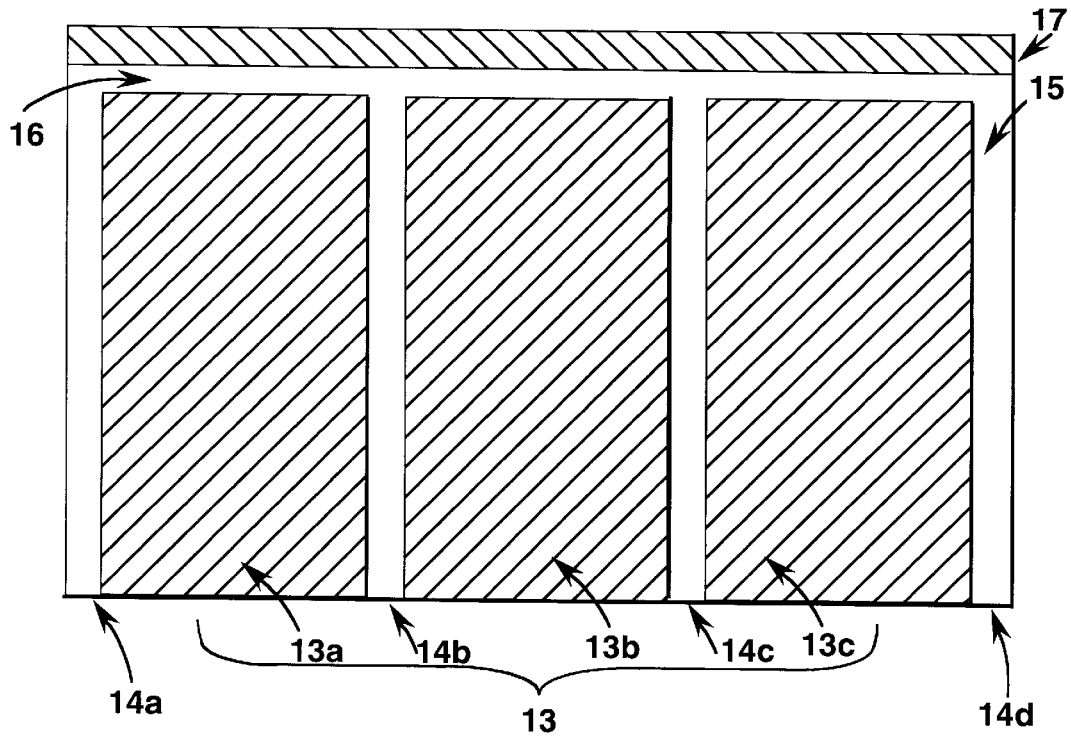
FIGS. 2a–2c illustrate a method of making a scintillator pack including an x-ray damage shield according to an embodiment of the present invention.
Figure 2B:
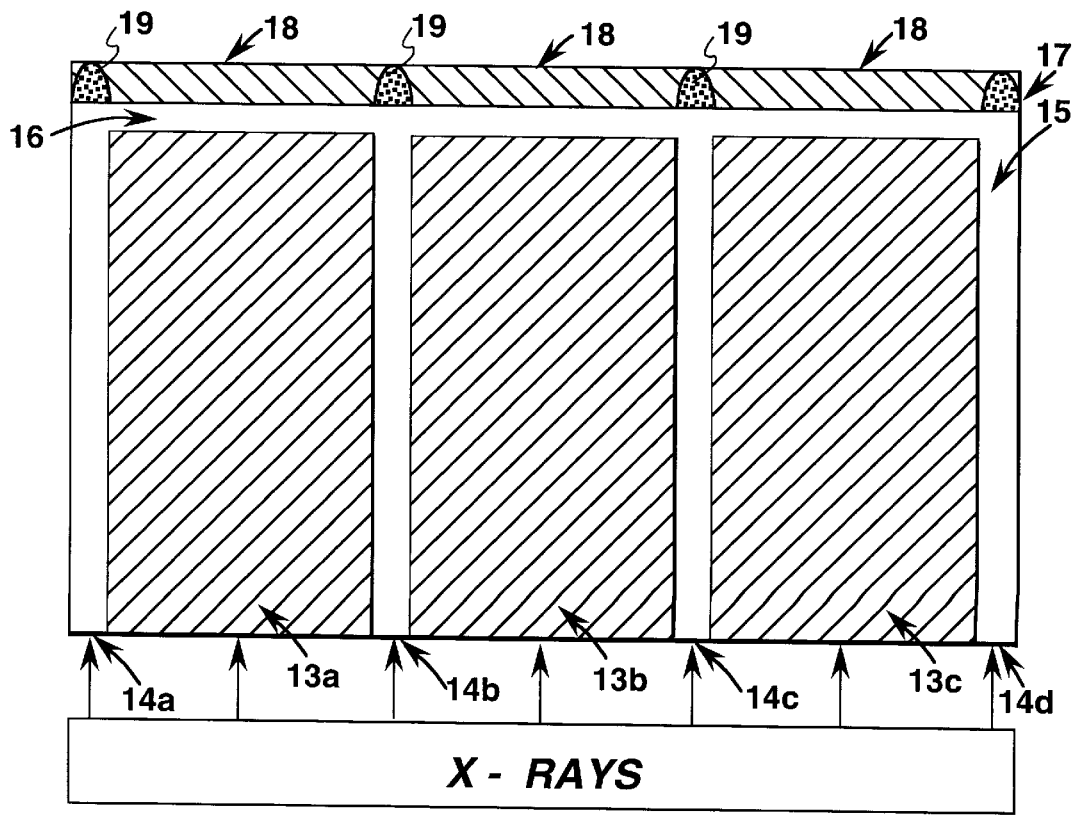
Figure 2C:
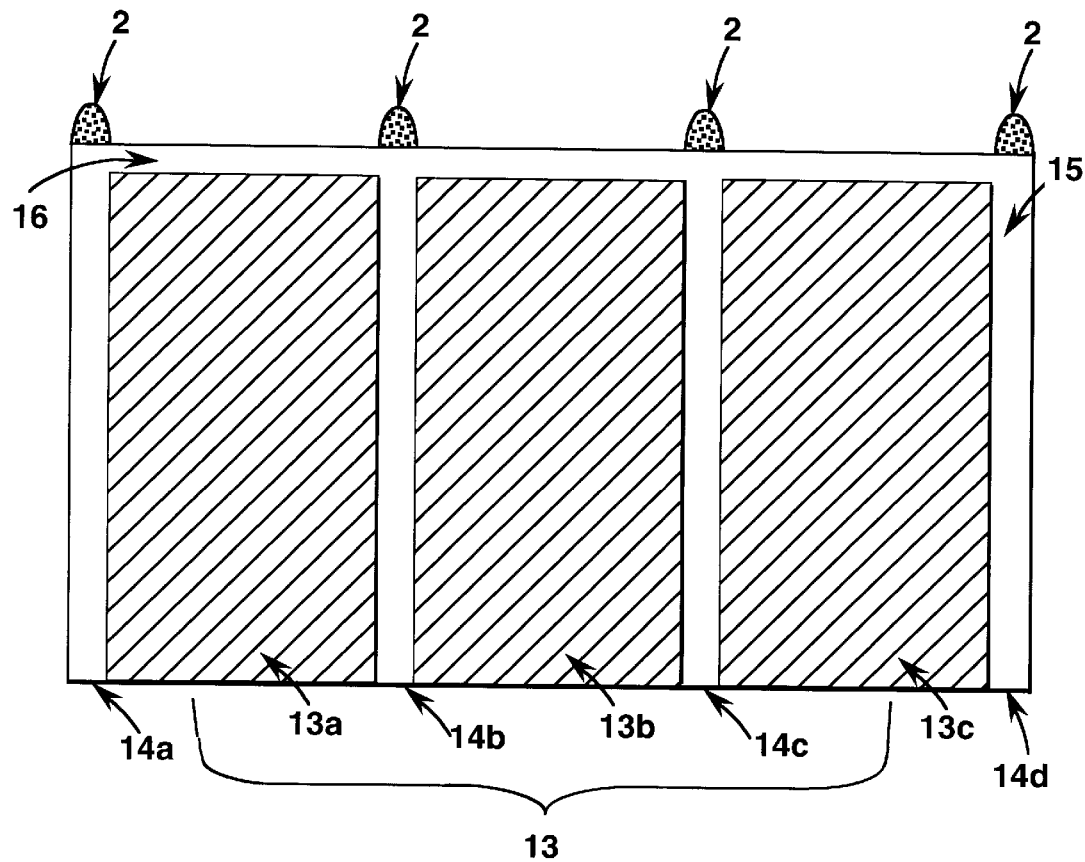

FIGS. 2a–2c illustrate steps in a method of forming a scintillator pack according to a preferred embodiment of the present invention.

In FIG. 2a an array 13 of scintillator pixels 13a, 13b, 13c, etc. is provided. Between the scintillator regions of the pixels are inter-scintillator regions 14a, 14b, 14c, 14d, etc. In a similar fashion to FIG. 1, FIGS. 2a–2c show only a fraction of the entire array for ease of illustration, and in general, the array will contain many more pixels than those shown in FIGS. 2a–2c. A scintillation light reflecting layer 15 is formed in the inter-scintillator regions 14a, 14b, 14c, 14d, etc. between the pixels 13a, 13b, 13c.

The scintillation light reflecting layer 15 is preferably a castable low index of refraction medium, such as an epoxy, embedded with a high refractive index solid, such as $TiO_2$ particles, where the $TiO_2$ particles and epoxy are intimately mixed. The scintillation light reflecting layer 15 may be formed not only in the inter-scintillator regions, but may also be formed to contain the surface reflector layer portion 16 over the scintillator pixels. It is preferred that the scintillation light reflecting layer 15 cover the scintillation pixels because the surface reflector layer portion 16 will aid in reflecting scintillation light toward the photodetectors (not shown) when the scintillator pack is used.

Once the scintillation light reflecting layer 15 is formed, an x-ray absorbing precursor layer 17 is formed over the scintillation light reflecting layer and the array 13. The x-ray absorbing precursor layer 17 is preferably formed of a material which, when ultimately cured, will absorb the x-rays used when the scintillator pack is employed to detect x-rays, and will thus protect the underlying regions from those x-rays. In the context of the present invention the term "cured" or "curable" means that properties of the curable material change when exposed to certain wavelengths of radiation. The x-ray absorbing precursor layer 17 should preferably also be a material which is curable by radiation, and thus may be selectively patterned using radiation.

For example, if the x-ray absorbing precursor layer 17 is to be cured using x-rays, the precursor layer may comprise materials such as x-ray curable epoxies or resins. Likewise, if the if the x-ray absorbing precursor layer 17 is to be cured using ultraviolet (UV) radiation, then the precursor layer may comprise materials such as UV curable epoxies. In practice, of course, the UV curable materials are also often x-ray curable, and thus a particular precursor material may be both x-ray and UV curable.

The precursor layer 17, in addition to being curable, should also contain a high density material which absorbs x-rays well. For example, high density metals such as hafnium, tantalum, tungsten, rhenium, platinum, gold, lead, and alloys of these metals may be used as the high density material. Other appropriate materials include high density compounds such as hafnium oxide or tungsten oxide. The high density material may be introduced into the precursor layer 17 by a number of methods. For example, if the precursor layer is to include a curable material, such as an epoxy, then particles of the high density material or materials may be mixed with the epoxy. In this case, the particles of the high density material may be in powder form. Preferably, the high density particles are mixed with the epoxy prior to applying the epoxy over the array 13 and the scintillation light reflecting layer 15, in order to obtain a more uniform distribution of high density particles. However, the particles may also be introduced into the epoxy after applying the epoxy.

In the case of a precursor material which is cured by x-ray, UV, or blue radiation, a UV or blue emitting scintillator such as high purity $Y_2O_3$ or $Gd_2O_3$, or Ce doped oxides such as lutitium silicate can be added to the curable material to more efficiently cure the curable material by converting some fraction of the x-ray flux into UV or blue light. Local emission of the UV or blue light from this scintillator allows for UV or blue curing of the filled curable material In such cases, the scintillator remains in the filled epoxy after construction of the scintillator pack and aids in the attenuation of the x-rays in use and thus protects the scintillation light reflecting layer 15 in the inter-scintillator regions.

A UV or blue emitting solid scintillator sheet can be provided above the precursor material to enhance curing of the precursor in the interscintillator regions. X-rays impinging upon the scintillator sheet will cause the sheet to emit scintillation light, and the scintillation light incident upon the precursor material will enhance curing.

FIG. 2b illustrates the selective exposure of the x-ray absorbing precursor layer 17 to x-ray radiation. In FIG. 2b, the curing x-rays are directed to the scintillator pack from the side opposite to the x-ray absorbing precursor layer 17. The scintillator pixels 13a, 13b, 13c, etc. will tend to prevent the x-rays from passing through the scintillator pack at their locations during this exposure step, and thus will shield the x-ray absorbing precursor layer from the exposing x-rays. However, the scintillation light reflecting layer 15 will tend to allow the x-rays to pass through to the precursor layer 17. Thus, the x-ray absorbing precursor layer 17 will selectively absorb the x-rays in first precursor regions 19 which are located above the inter-scintillator regions filled with the scintillation light reflecting layer 15. The second precursor regions 18 located between the first precursor regions, are not exposed to the x-rays, or at least have insufficient exposure to allow for curing. Thus, the first precursor regions 19 will be formed self-aligned to the inter-scintillator regions 14a, 14b, 14c, 14d, etc. filled with the scintillation light reflecting layer 15.

FIG. 2b illustrates selective exposure of the x-ray absorbing precursor layer 17 to x-ray radiation. Alternatively, UV radiation may be used if the pixel material is UV absorbing and layer 15 is UV transparent. It is preferred that the radiation exposing the x-ray absorbing precursor layer 17 is sufficiently collimated in the direction along the inter-scintillator regions so that a sufficient amount of radiation be allowed to travel through the inter-scintillator regions 14a, 14b, 14c, 14d, etc., and expose the x-ray absorbing precursor layer 17.

While FIG. 2b illustrates the preferred method of exposing the x-ray absorbing precursor layer 17 in a manner which is self-aligned to the inter scintillator regions, the exposure step may be other than self-aligned. For example, the x-ray absorbing precursor layer 17 may be exposed from above through a photomask. The photomask will contain the pattern desired for the x-ray absorbing layer. In this case, the photomask is placed near the x-ray absorbing layer. Exposing radiation is directed through the transparent regions of the photomask and will impinge upon the x-ray absorbing precursor layer 17. This method is less preferred because it requires alignment of the photomask with the inter-scintillator regions.

FIG. 2c illustrates steps in the method of this embodiment after the x-ray absorbing precursor layer 17 has been exposed to curing radiation. The second precursor regions 18 are removed leaving just the first precursor regions 19 as the x-ray absorbing layer 2. The second precursor regions 18 can be removed, for example, by washing the percursor layer 17 with a solution which dissolves the second uncured precursor regions, but not the radiation cured first precursor regions. For example, if an epoxy based composite is used as the precursor acetone can be used to dissolve the uncured epoxy.

FIGS. 3a–3d illustrate steps in a method of forming a scintillator pack including an x-ray damage shield according to another preferred embodiment of the present invention. The steps of forming the array 13 of scintillator pixels 13a, 13b, 13c, and the scintillation light reflecting layer 15 in this embodiment is the same as that of the method according to the embodiment of FIGS. 2a–2c. After the scintillation light reflecting layer 15 is formed, an x-ray sensitive photoresist layer 27 is formed over the array 13 and the interscintillator regions 14a, 14b, 14c, 14d, etc., filled with the light reflecting layer material. The photoresist layer 27 may be formed by known methods, such as those disclosed in chapters 12–14 in "Silicon Processing for the VLSI Era, Volume 1: Process Technology" by S. Wolf et al., Lattice Press, 1986, which is incorporated herein by reference.

Figure 3A:
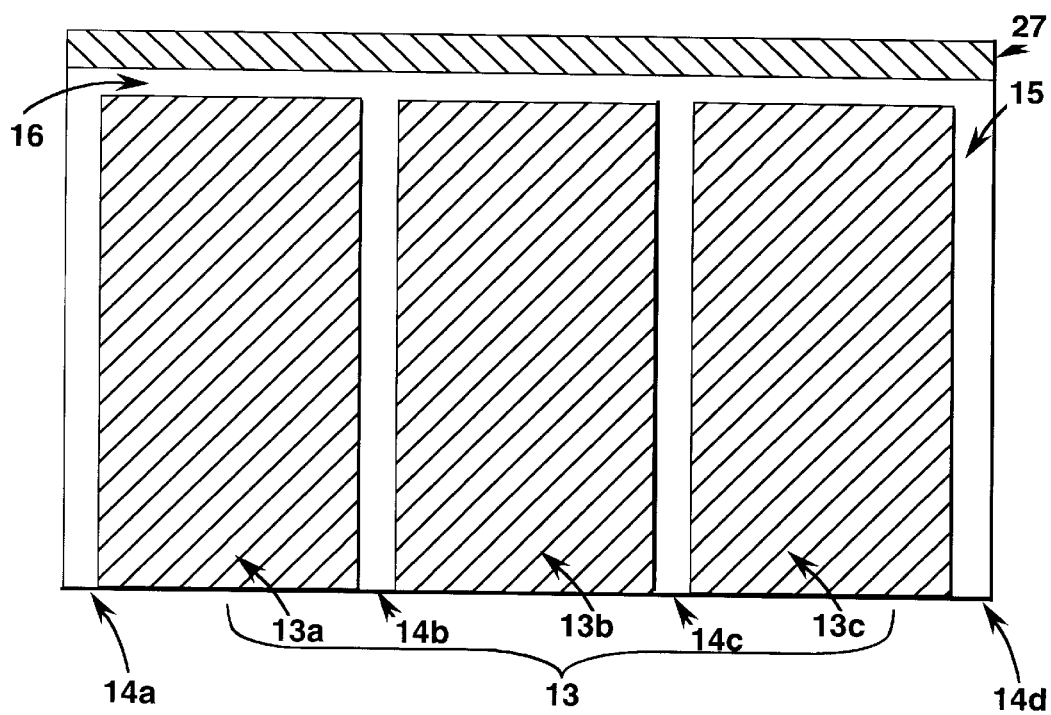
FIGS. 3a–3d illustrate a method of making a scintillator pack including an x-ray damage shield according to another embodiment of the present invention.
Figure 3B:
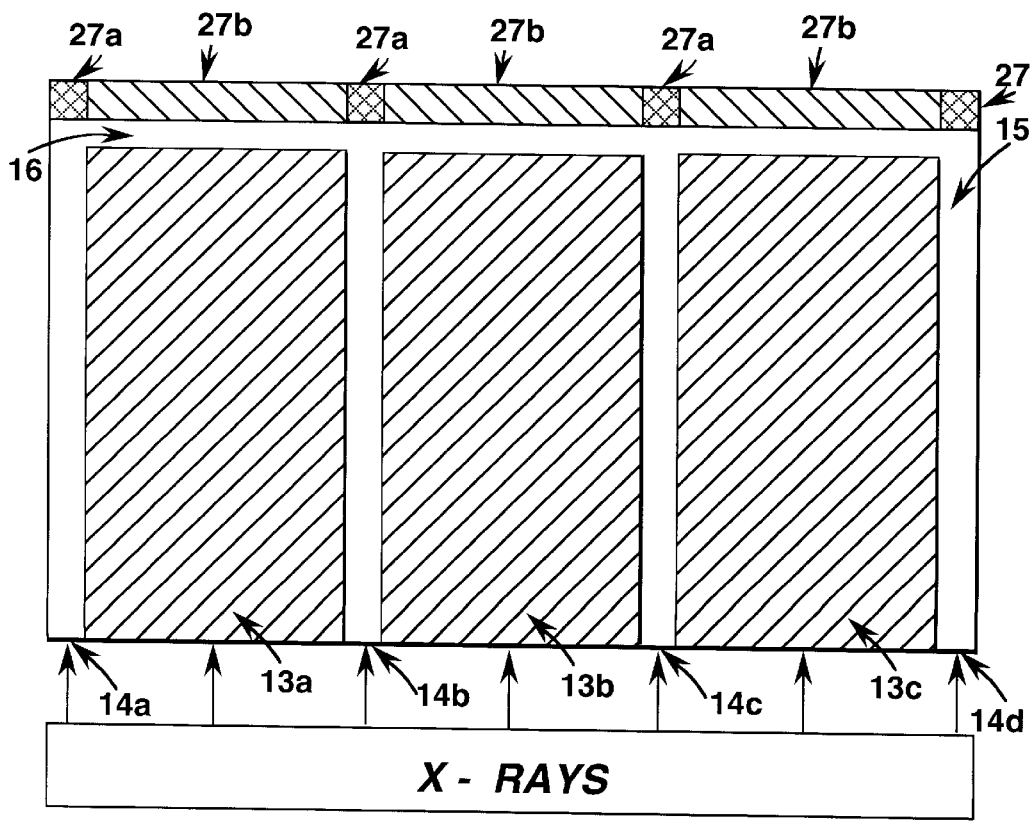

After the photoresist layer 27 is formed, the photoresist layer 27 is selectively exposed to x-ray radiation to form first resist regions 27a but leaving second resist regions 27b unexposed, or at least only slightly exposed as illustrated in FIG. 3b. The exposing radiation is preferably directed to the scintillator pack from the side opposite to the photoresist layer 27. In a similar fashion to the method according to the embodiment of FIGS. 2a–2c, the scintillator pixels shield the second resist regions 27b from the exposing x-ray radiation, while the scintillation light reflecting layer 15 allows the x-rays to pass through and impinge upon the resist regions 27a. Thus the photoresist layer 27 will absorb the x-rays selectively in the first resist regions 27a which are above the inter-scintillator regions 14 filled with the scintillation light reflecting layer 15. The first resist regions 27a will thus be un-crosslinked self aligned to the inter-scintillator regions filled with the scintillation light reflecting layer 15. As with the embodiment according to FIGS. 2a–2c, UV emitting scintillators can be added to the photoresist to improve its sensitivity to x-rays.

UV light may be used in the place of x-ray radiation to expose the resist layer as with the embodiment according to FIGS. 2a–2c. In general, most photoresists that can be cured with UV can also be cured with x-rays. Typical methods are disclosed, for example, in chapters 12–14 in "Silicon Processing for the VLSI Era, Volume 1: Process Technology" by S. Wolf et al, Lattice Press, 1986, which is incorporated herein by reference. Also, as with the embodiment according to FIGS. 2a–2c, the photoresist may be exposed through a photomask placed over the photoresist layer 27 instead of through the inter-scintillator regions.

Figure 3C:
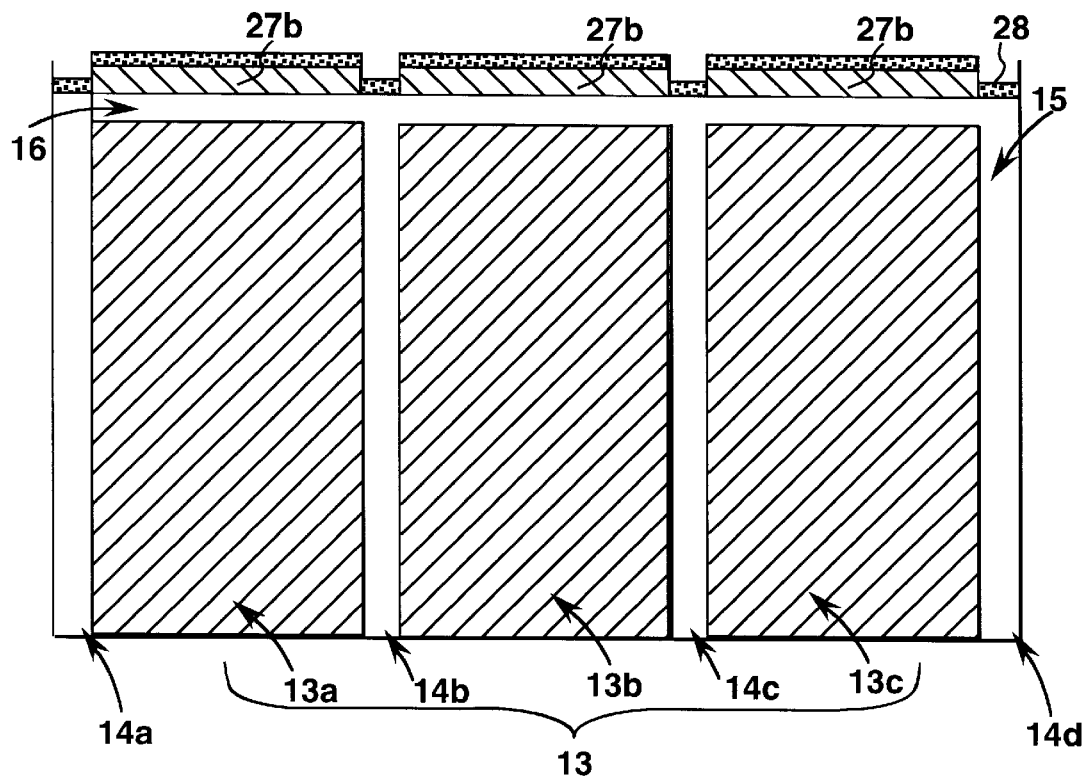

FIG. 3c illustrates the steps in this embodiment after the photoresist has been exposed to radiation. The un-crosslinked first resist regions 27a are removed through dissolution and washing. Methods for removing resist after a patterningexposure to radiation are known.

Following the removal of the first resist regions 27a exposing the regions above the inter-scintillator regions, the second resist regions 27b remain as shown in FIG. 3c. Following the removal of the first regions, an x-ray absorbing material 28 is formed in the gaps left by the removal of the first resist regions. The material 28 may be formed by a number of deposition techniques. For example, the x-ray absorbing material may be formed by physical deposition techniques, such as evaporation or sputtering, or by other techniques such as electroless plating or chemical vapor deposition. Because the gaps left by the removal of the first resist regions 27a are self aligned to and over the interscinillator regions, the x-ray absorbing material 28 formed in the gaps will also be self aligned to and over the inter-scintillator regions 14.

Figure 3D:
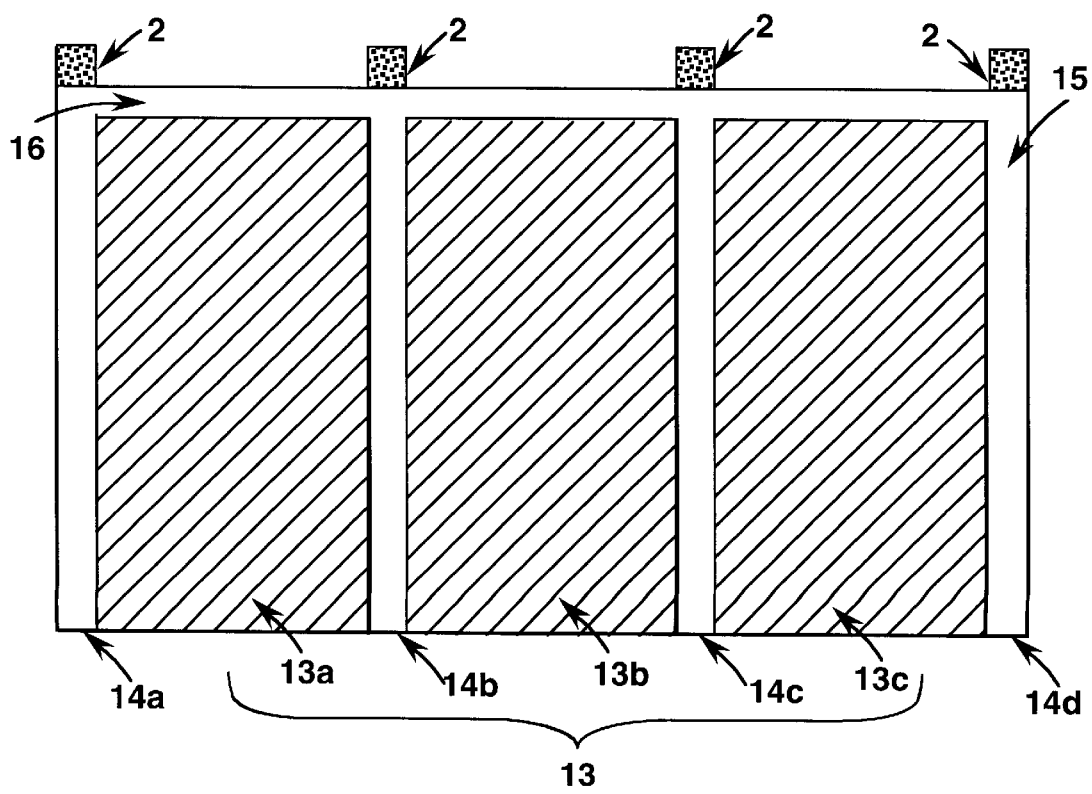

FIGS. 3c and 3d together illustrate a two stage plating technique for forming the x-ray absorbing material self aligned to and over the inter-scintillator regions 14. In the first stage, as illustrated in FIG. 3c, a thin nucleation layer of x-ray absorbing metalization is formed into the gaps, such as by plating. The thin metalization may also be formed on second resist regions in addition to being formed into the gaps. After the thin nucleation layer is formed, the second resist regions 27b are removed. Any metalization overlying the second resist regions 27b is also removed through this lift-off technique.

In FIG. 3d a second metalization layer is formed on the first thin metalization to increase the thickness of the x-ray absorbing metalization to an appropriate value for the resulting x-ray absorbing layer 2 to act as an x-ray shield. This second metalization layer may be formed by, for example, electroplating, electroless plating, or dipping the scintillator pack in molten solder, such as is done in electronics wave soldering. The plating can be performed, for example, with tungsten, gold, platinum, silver, lead, or alloys of these metals over the nucleation layer 28.

Alternatively, the second stage step of FIG. 3d may be omitted, and the x-ray absorbing material may be formed in the gaps between resist regions 27b in a single step if the final thickness of the x-ray absorbing material need not be much thicker than the resist layer 27. Also, the first stage in the two stage process may be performed by evaporation, sputtering, or chemical vapor deposition in addition to plating.

In another alternative, metalization may be formed in the gaps between the second resist regions by a selective deposition process other than plating, for example, by chemical vapor deposition. In this case, the metalization may be formed in a single step.

FIGS. 4a–4d illustrate steps in a method of forming a scintillator pack according to another preferred embodiment of the present invention. This method differs from the embodiment of FIGS. 3a–3d in at least two ways. First, in this embodiment, the x-ray absorbing material is formed prior to forming the photoresist layer. Second, in this embodiment, the photoresist layer is preferably exposed by using a photomask instead of directing the exposing radiation through the inter-scintillator regions.

The steps of forming the array 13 of scintillator pixels 13a, 13b, 13c, and the scintillation light reflecting layer 15 in this embodiment is the same as that of the method according to the embodiments of FIGS. 2a–2c and 3a–3d. After the scintillation light reflecting layer 15 is formed, an x-ray absorbing material 30 is formed over the array 13 and the inter-scintillator regions, 14a, 14b, 14c, 14d, etc., filled with the light reflecting layer 15. Appropriate materials for the x-ray absorbing material 30 include high density metals such as hafnium, tantalum, tungsten, rhenium, platinum, gold, lead, and alloys of these metals. Other appropriate materials include high density compounds such as hafnium oxide or tungsten oxide. A photoresist layer 27 is then formed on the x-ray absorbing material 30.

Figure 4A:
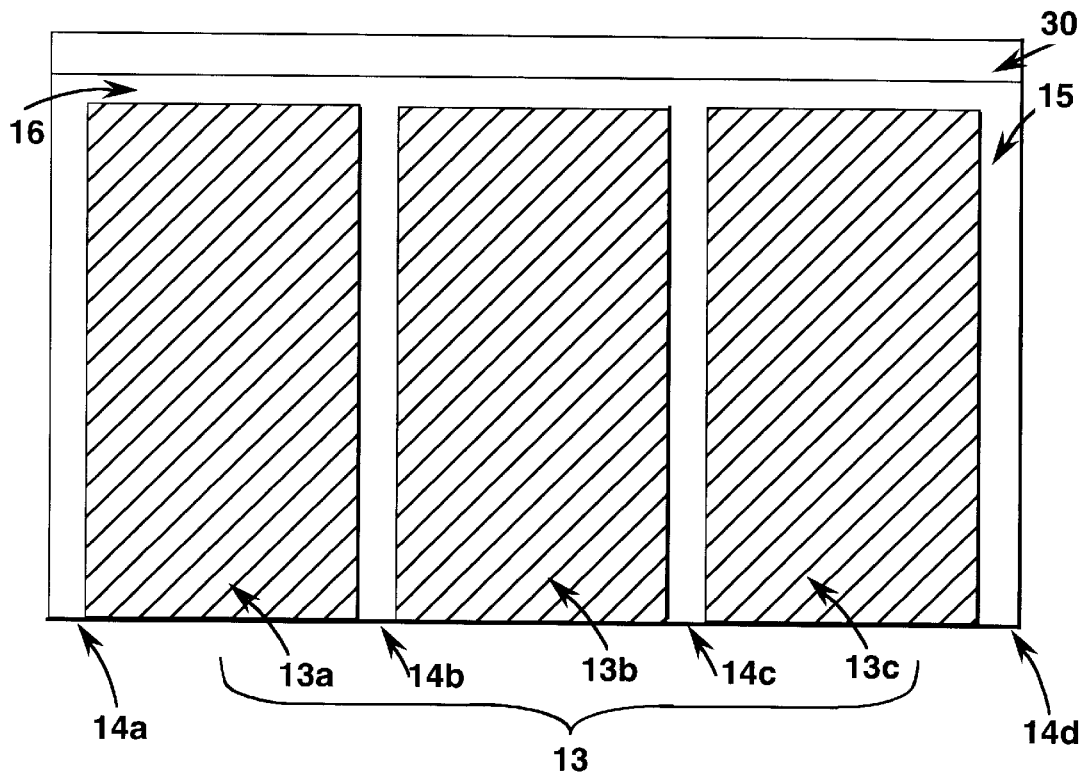
FIGS. 4a–4d illustrate a method of making a scintillator pack including an x-ray damage shield according to another embodiment of the present invention.
Figure 4B:
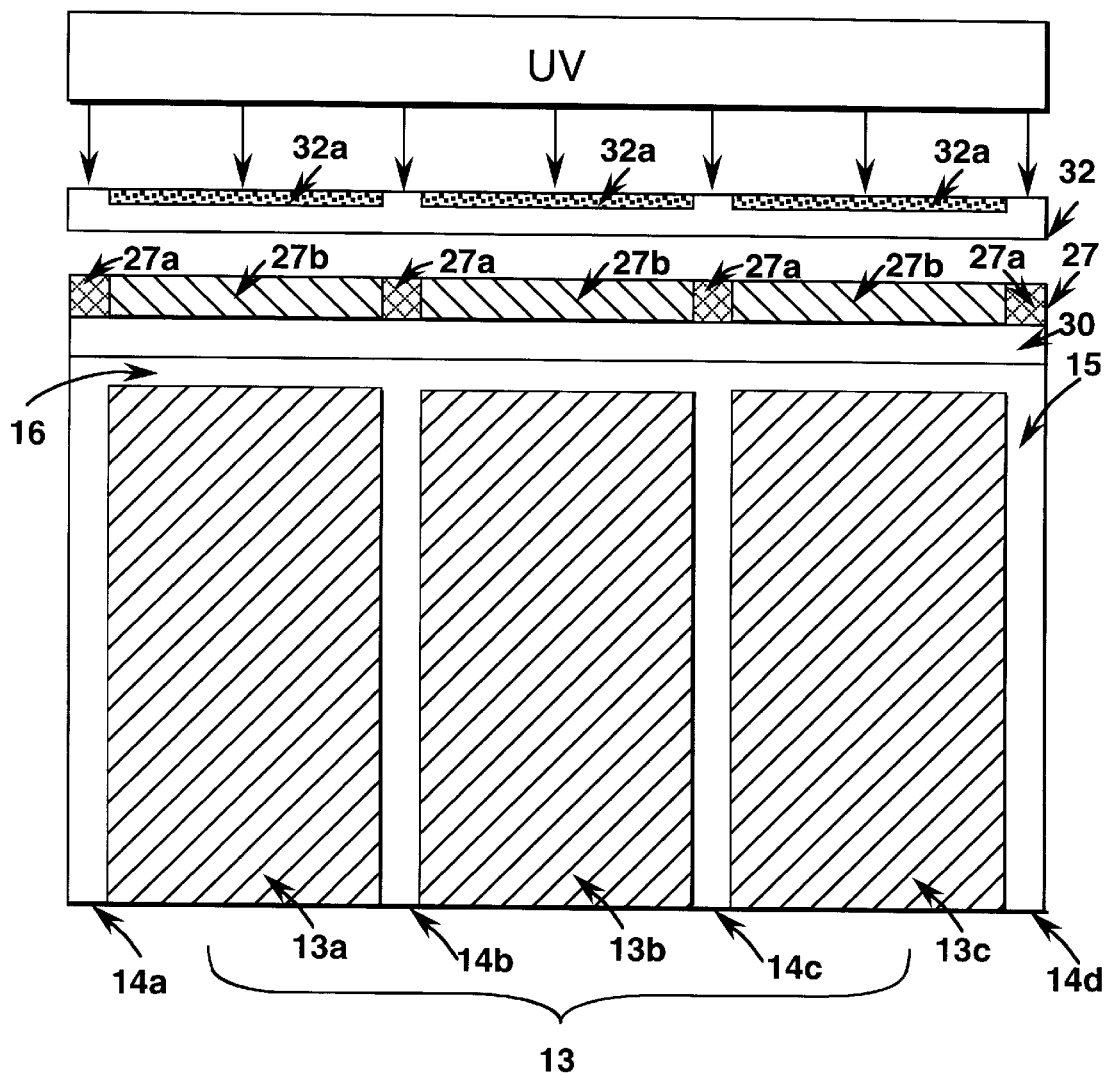

As shown in FIG. 4b, after the photoresist is formed, the photoresist layer 27 is preferably exposed through a photomask 32 which has the pattern of the ultimate x-ray absorbing layer which shields the regions of the scintillation light reflecting layer 15 in the inter-scintillator regions 14a, 14b, 14c, 14d, etc. The photomask 32 includes opaque regions 32a, which do not allow the exposing radiation to pass through the photomask 32, and transparent regions between the opaque regions 32a which do allow the exposing radiation to pass. The photomask 32 in FIG. 4b is appropriate for exposing a negative photoresist, where the unexposed photoresist regions are then removed. However, a positive photoresist and a photomask which exposes the regions of the photoresist over the regions between the interscintillator regions may also be used, and the exposed photoresist then removed.

In the embodiment of FIGS. 4a–4d the photoresist layer 27 is preferably exposed through the photomask 32 instead of through the inter-scintillator regions because the x-ray absorbing material 30 typically will block the exposing radiation. In the case that x-ray absorbing material is transparent to the exposing radiation, the photoresist layer 27 may be exposed by directing the exposing radiation through the inter-scintillator regions as in other embodiments.

Figure 4C:
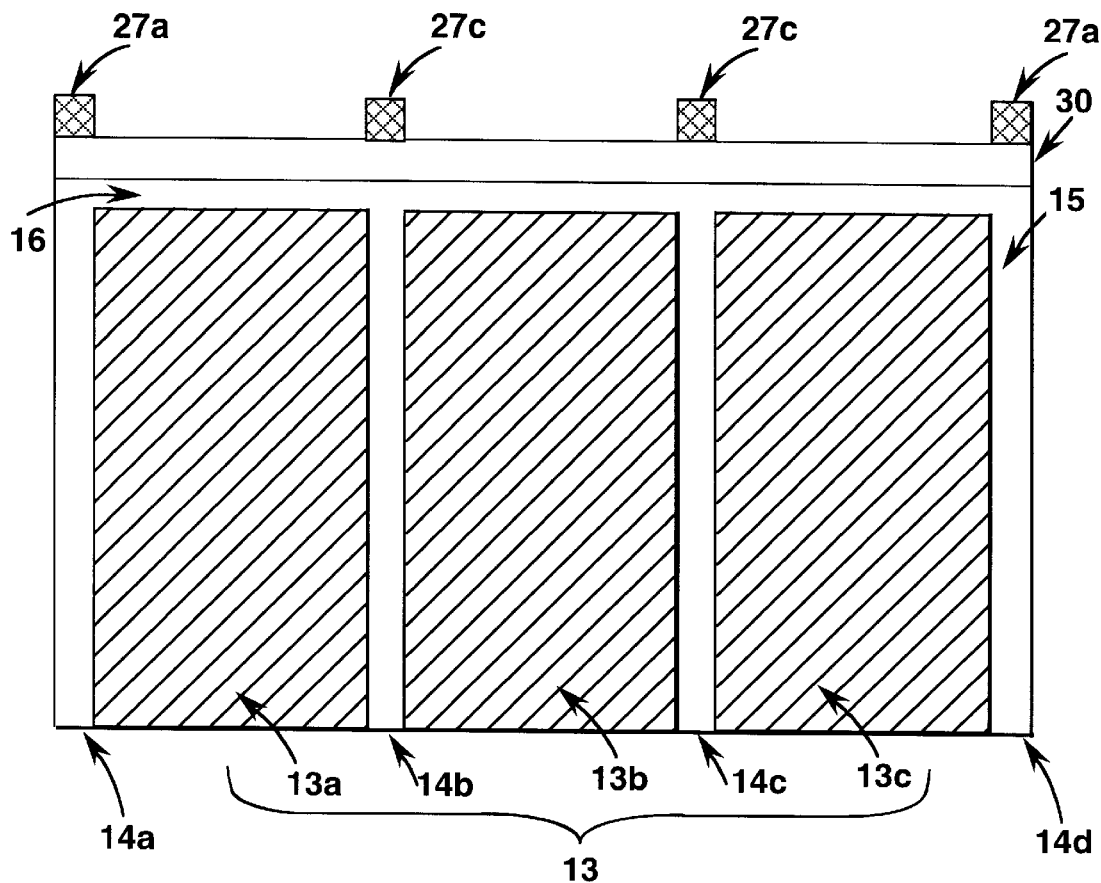

The exposing radiation is directed through the photomask 32 to the photoresist 27 to expose a pattern in the photoresist layer 27 of the ultimate x-ray absorbing layer. Specifically, first resist regions 27a of photoresist layer 27 have the pattern of the ultimate x-ray absorbing layer 2. The first resist regions 27a are over and aligned to inter-scintillator regions filled with the scintillation light reflecting layer 15. The regions of the photoresist layer 27, other than the first resist regions 27a, are the second resist regions 27b. Either positive or negative photoresist may be used as is well known in the art of photolithography. If positive photoresist is used, the second resist regions 27b are exposed, but not the first resist regions 27a during the exposure step. If negative photoresist is used, the first resist regions 27a are exposed, but not the second resist regions 27b. In either case, after the exposure step the second resist regions 27b are removed leaving the first resist regions 27a as an etch mask as shown in FIG. 4c. Techniques for removing the second resist regions are known and discussed for example in chapters 12–14 in "Silicon Processing for the VLSI Era, Volume 1: Process Technology" by S. Wolf et al., Lattice Press, 1986.

Figure 4D:
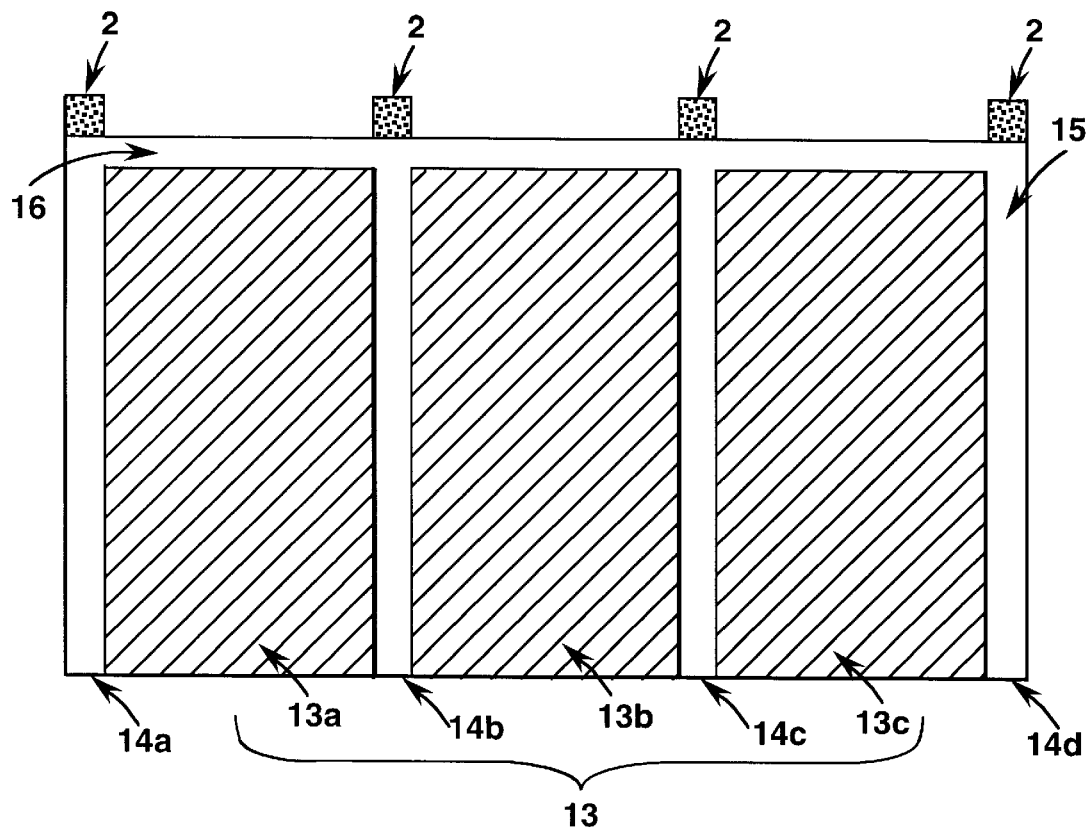

The x-ray absorbing material 30 is then etched using the first resist regions 27a as an etch mask and thereby patterned into the x-ray absorbing layer 2, as shown in FIG. 4d. Appropriate techniques for etching include wet chemical etching and dry chemical etching such as plasma etching. Subsequently the first resist regions are removed leaving the completed x-ray absorbing layer.

FIGS. 7a–7d illustrate steps in a method of forming a scintillator pack including an x-ray damage shield according to another embodiment of the present invention. The steps of forming the array 13 of scintillator pixels 13a, 13b, 13c, and the scintillation light reflecting layer 15 in this embodiment is the same as that of the method according to the embodiment of FIGS. 2a–2c. After the scintillation light reflecting layer 15 is formed, a radiation curable layer 47 is formed over the array 13 and the interscintillator regions 14a, 14b, 14c, 14d, etc., filled with the light reflecting layer material. The radiation curable layer 47 can be any material that cures with radiation, such as with x-ray, UV, or blue radiation. For example, the radiation curable layer 47 may be photoresist, radiation curable epoxy, or radiation curable ink. In the aspect of the invention according to FIGS. 7a–7d, the radiation curable layer 47 need not contain a high density x-ray absorbing material, because the radiation curable layer 47 will be ultimately patterned to form an alignment layer for an x-ray protection shield. However, the radiation curable layer 47 may include high density x-ray absorbing material, if desired.

In the case of a radiation curable layer material which is cured by x-ray, UV, or blue radiation, a UV or blue emitting scintillator such as high purity $Y_2O_3$ or $Gd_2O_3$, or Ce doped oxides such as lutitium silicate, can be added to the curable material to more efficiently cure the curable material by converting some fraction of the x-ray flux into UV or blue light as in the embodiment of FIGS. 2a–2c.

Figure 7A:
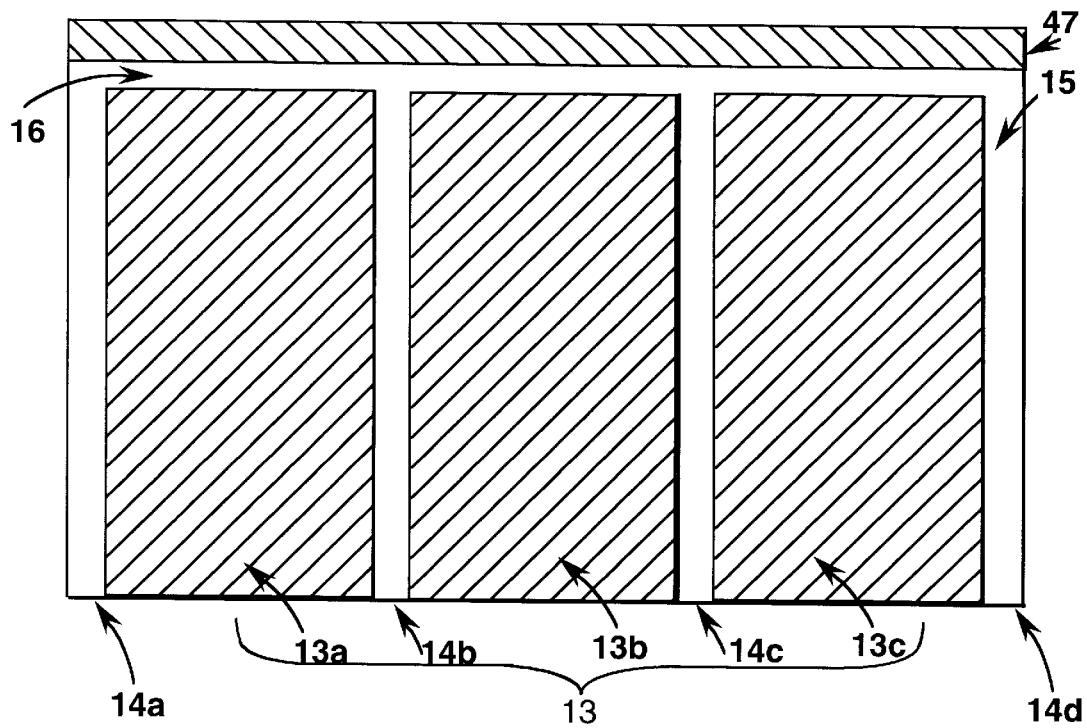
FIGS. 7a–7d illustrate a method of making a scintillator pack including an x-ray damage shield according to another embodiment of the present invention.
Figure 7B:
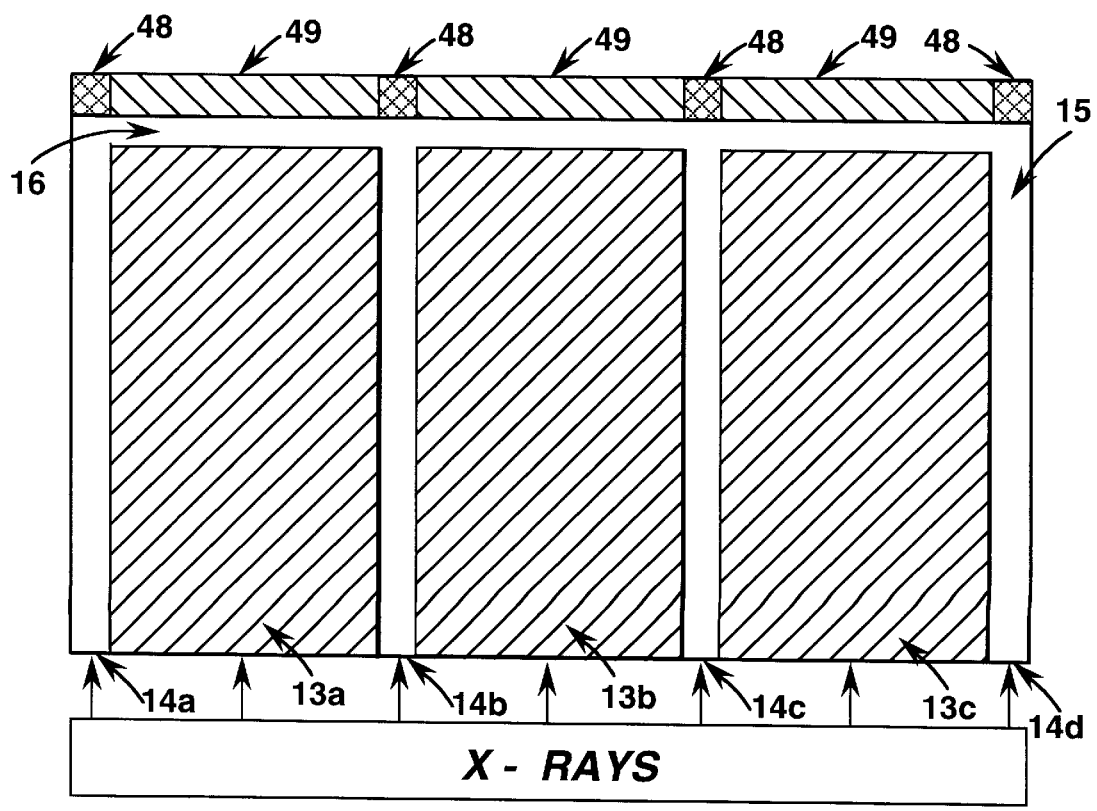

After the radiation curable layer 47 is formed, the radiation curable layer 47 is selectively exposed to x-ray radiation to form first regions 48 selectively over and self aligned to the interscintillator regions 14a, 14b, 14c, 14d, etc. as shown in FIG. 7b. FIG. 7b shows first regions 48 exposed to the x-ray radiation and second regions 49 unexposed to the radiation. The exposing radiation is preferably directed to the scintillator pack from the side opposite to the radiation curable layer 47 so that the scintillator pixels shield the second regions 49 from the exposing x-rays. Either UV or blue light may be used in the place of x-ray radiation to expose the radiation curable layer 47 as appropriate.

FIG. 7b shows the curing radiation directed through the interscintillator regions. Alternatively the curing radiation may be directed to the radiation curable layer 47 through a photomask, as illustrated in the embodiment of FIGS. 4a–4d. In this case, either the first regions 48, or the second regions 49, may be exposed to curing radiation. For example, if the radiation curable layer 47 is made of positive photoresist, then the second region can be exposed to curing radiation, and the second region removed as discussed with respect to the embodiment of FIGS. 4a–4d.

Figure 7C:
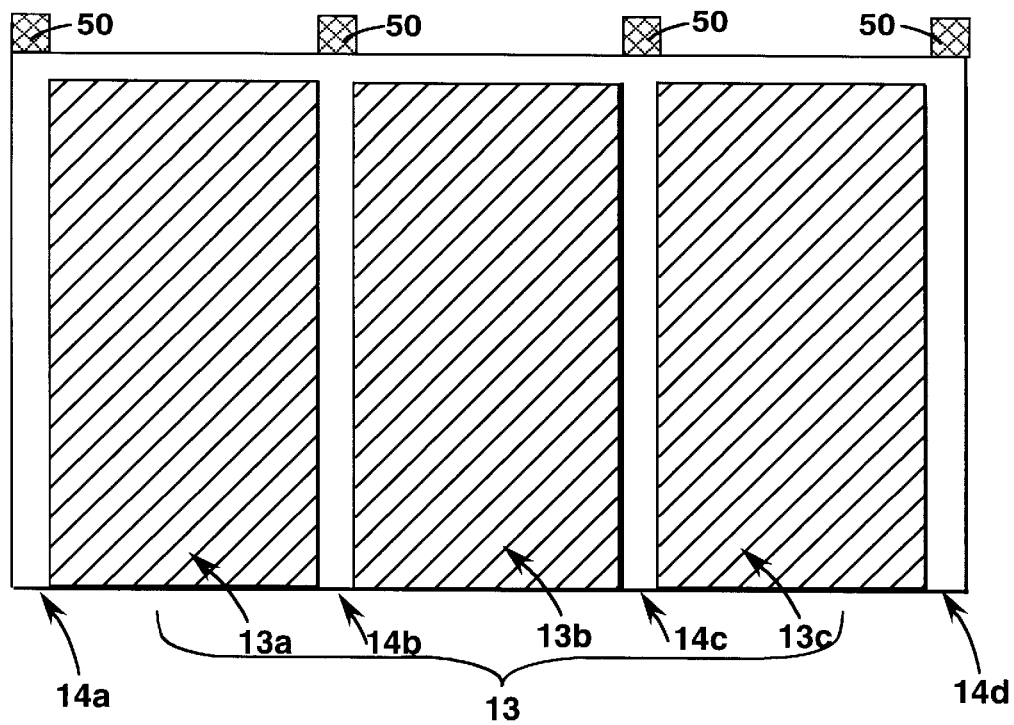

FIG. 7c illustrates the steps of removing the second regions 49. The second regions 49 may be removed by methods discussed with respect to the embodiments of FIGS. 2a–2c, 3a–3d, and 4a–4d. FIG. 7c shows the second regions 49 removed leaving the first regions 48, as an alignment layer 50. Alternatively, the first regions 48 may be removed prior to the second regions being moved, and the alignment layer 50 may be formed of a material other than that of the first regions 48 by forming material between the second regions. In this case, the material formed between the second regions may be formed, for example, by methods such as sputtering, electroless plating, evaporation, and chemical vapor deposition, as discussed with respect to earlier embodiments.

Figure 7D:
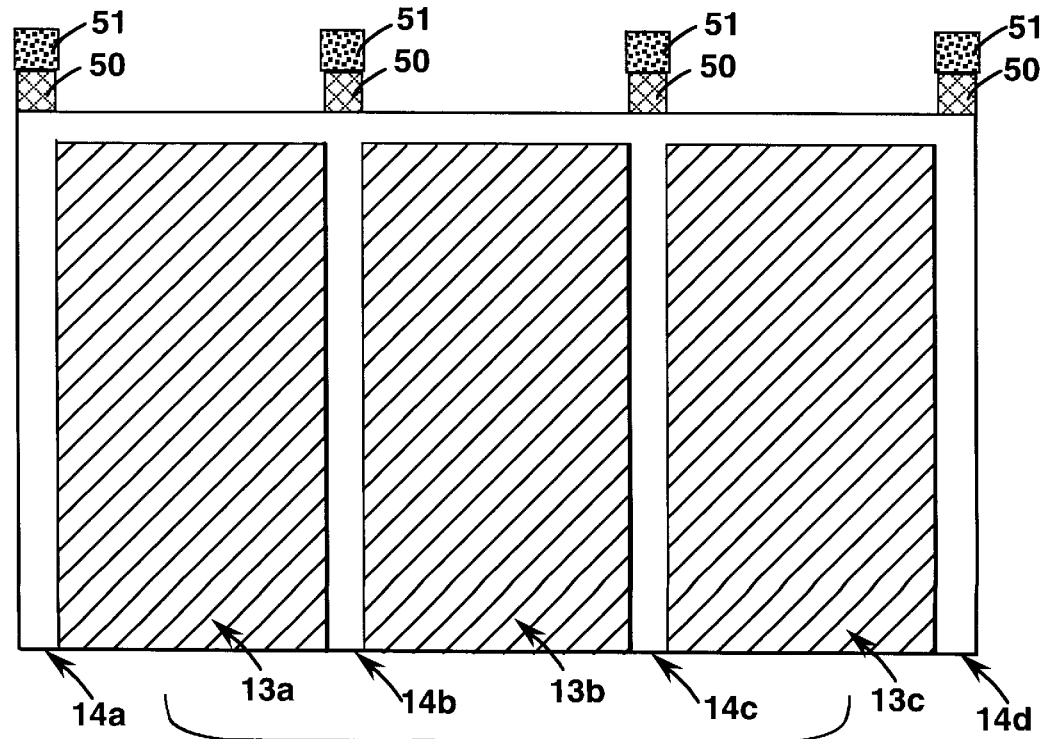

FIG. 7d illustrates the steps of forming an x-ray protection shield 51 over and aligned to the alignment layer 50. The alignment protection shield 51 may comprise, for example, wires or plates which are strung between plates of a collimator assembly. The alignment layer 50 allows precise alignment of the x-ray protection shield 51 over the alignment layer 50, and thus over the interscintillator regions, 14a, 14b, 14c, and 14d. The alignment protection shield may be made of, for example, tungsten.

Figure 8A:
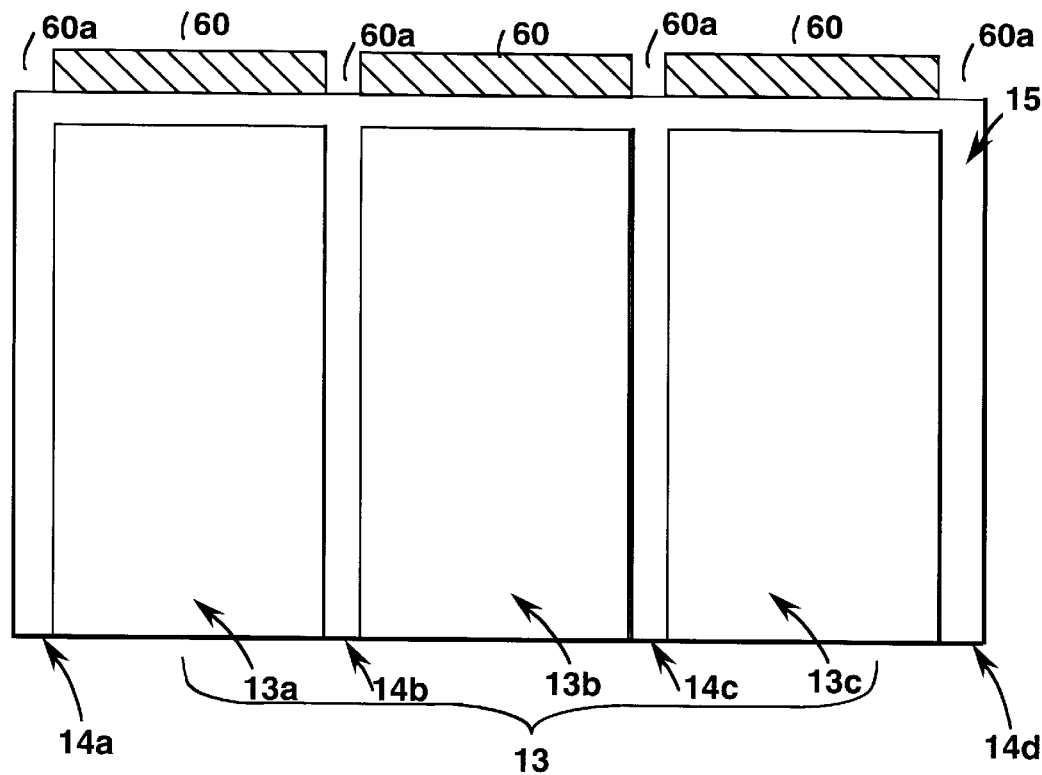
FIGS. 8a–8c illustrate a method of making a scintillator pack including an x-ray damage shield according to another embodiment of the present invention.
Figure 8B:
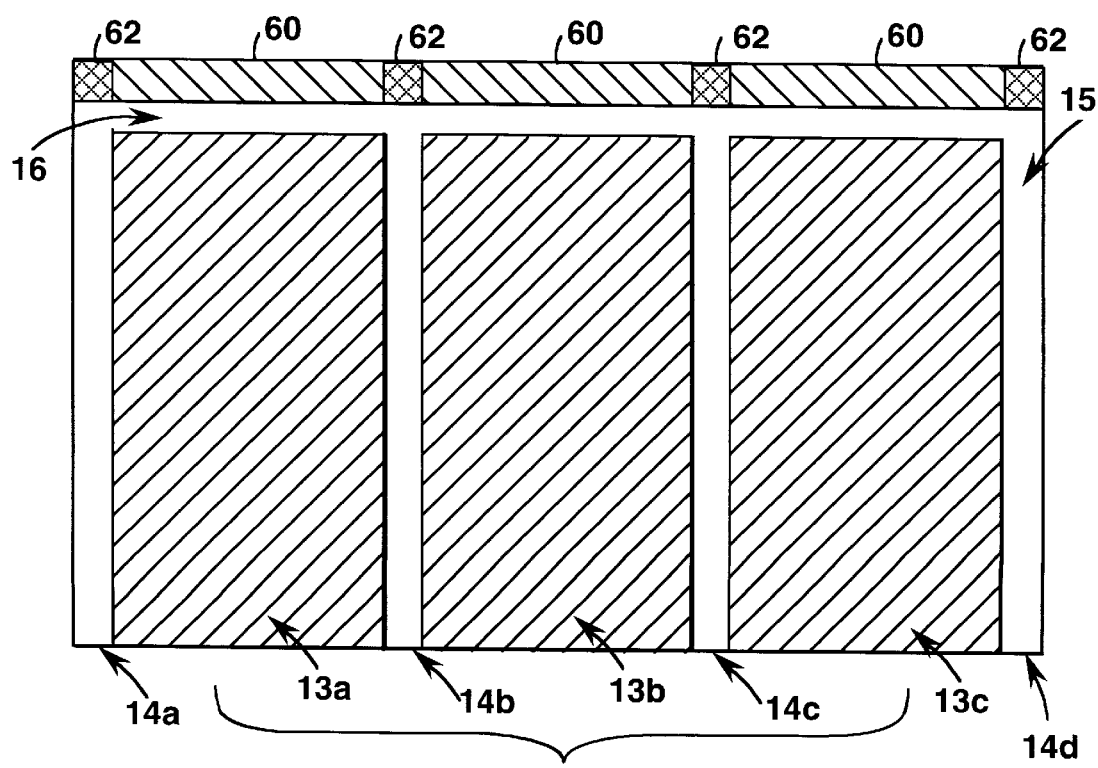
Figure 8C:
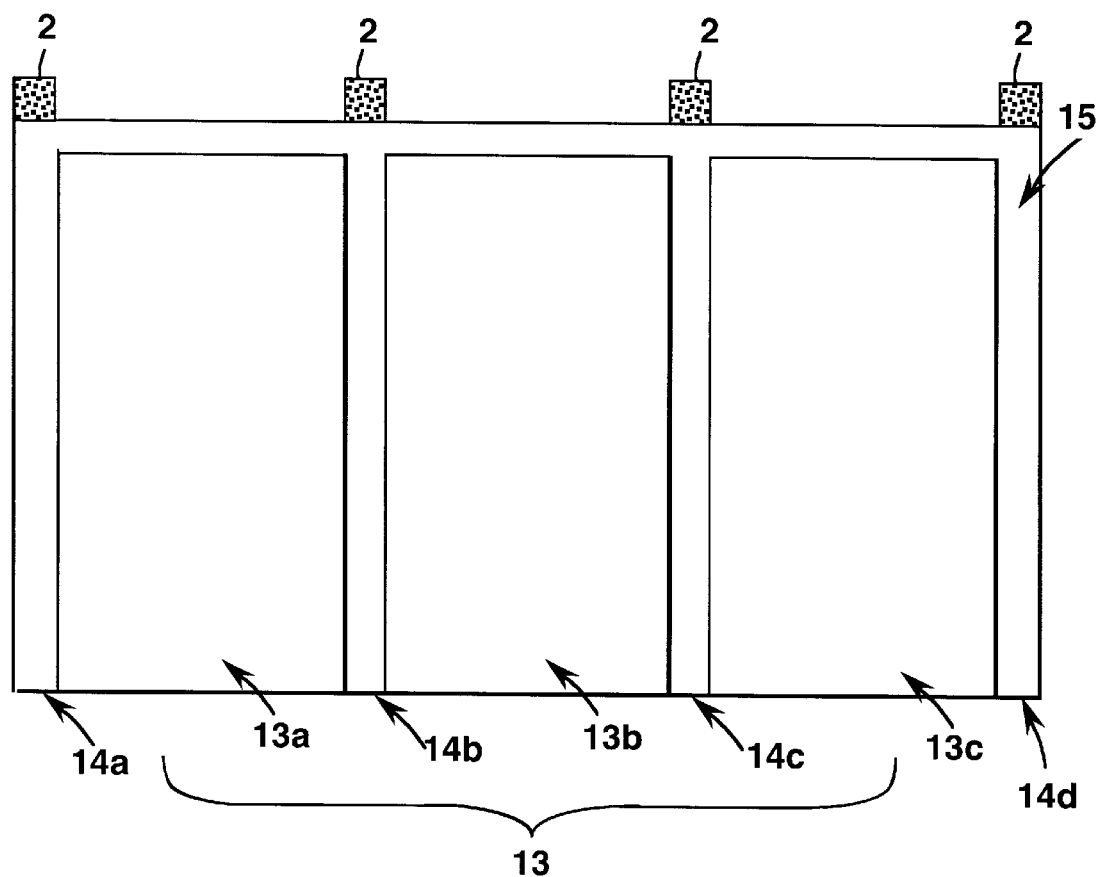

FIGS. 8a–8c illustrate steps in a method of forming a scintillator pack including an x-ray damage shield according to another embodiment of the present invention. According to this embodiment, an x-ray absorbing curable ink is used along with a screening process to form the x-ray damage shield of the scintillator pack. The steps of forming the array 13 of scintillator pixels 13a, 13b, 13c, and the scintillation light reflecting layer 15 in this embodiment is the same as that of the method according to the embodiment of FIGS. 2a–2c. After the scintillation light reflecting layer 15 is formed, an x-ray absorbing curable ink 62 is formed selectively over the interscintillator regions 14a, 14b, 14c, 14d, etc.

As shown in FIG. 8a a screening mask 60 is aligned near and selectively over the array 13 such that the regions above the interscintillator regions are exposed through holes 60a in the screening mask 60. The x-ray absorbing curable ink 62 is then applied over the screening mask 60 such that the ink 62 fills the holes 60a. The ink 62 is applied, for example, by blading the ink across the mask to fill the holes 60a and to remove any excess ink 62. Thus, as shown in FIG. 8b the ink 62 fills the holes in the screening mask 60.

The x-ray absorbing curable ink 62 may be, for example, pad printable radio opaque ink, #114-29, made by Creative Material, Inc. The x-ray absorbing curable ink may be any curable ink which when cured provides good x-ray absorbing properties. In this regard, the x-ray absorbing curable ink may be formed by mixing high density particles, such as hafnium, tantalum, tungsten, rhenium, platinum, gold, or lead particles, with a curable ink with poorer x-ray absorbing properties.

After the x-ray absorbing curable ink is screened on the ink is cured to form the x-ray absorbing layer 2 as shown in FIG. 8c. The curable ink may be cured, for example, by heating the curable ink, or illuminating the curable ink with blue, UV, or x-ray radiation. If the curable ink tends to run, the screen mask 60 is preferably removed after curing. Otherwise, the screen mask 60 may be removed either before or after curing. The thickness of the x-ray absorbing layer 2 will depend upon the x-ray absorbing properties of that layer. In general, the x-ray absorbing layer 2 may be thinner if that layer has good x-ray absorbing properties. The inventors have found a preferred thickness of the x-ray absorbing layer to be approximately 0.010 inches when the x-ray absorbing curable ink 62 is pad printable radio opaque ink, #114-29, made by Creative Material, Inc.

Figure 6:
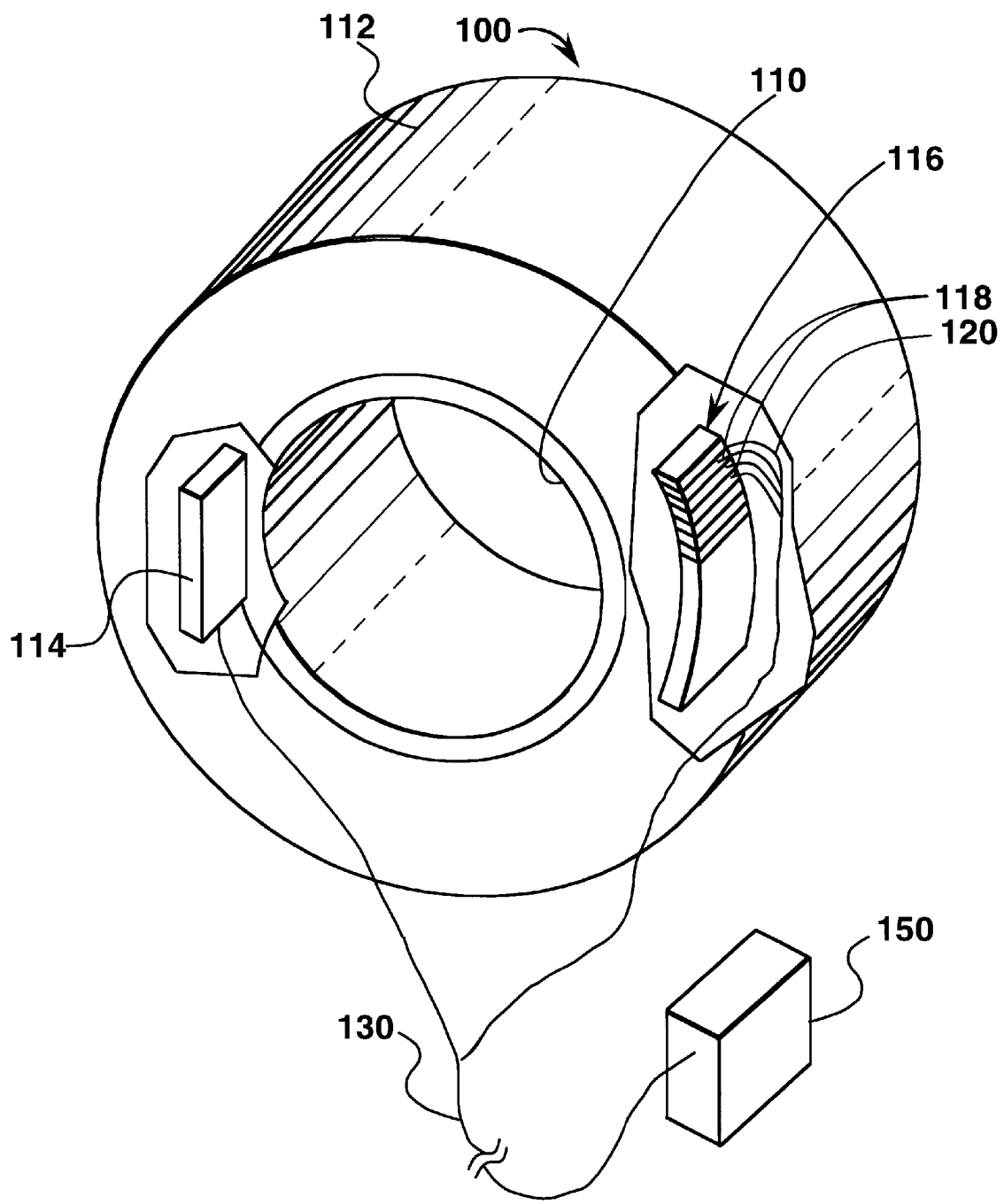
FIG. 6 is a stylized perspective of a portion of a CT machine containing a scintillator pack including an x-ray damage shield according to another embodiment of the invention.

A computed tomography (CT) scanning system 100 is illustrated schematically in FIG. 6. This CT scanning system 100 comprises a cylindrical enclosure 110 in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used to connect the electronics on the gantry to the rest of the system. The electronics on the gantry include an x-ray source 114 which preferably produces a fan shaped x-ray beam which encompasses a scintillation detector system 116 mounted on the gantry on the opposite side of the cylinder 110. The fan pattern of the x-ray source is disposed in the plane defined by the x-ray source and the scintillation detector system 116.

The scintillation detector system 116 is very narrow or thin in the direction perpendicular to the plane of the x-ray fan beam. Each pixel 118 of the scintillation detector system incorporates a solid translucent bar of a scintillator material and a photodetector diode optically coupled to that scintillator bar. The pixels are arranged in an array such as discussed above with respect to FIG. 1. The pixel array is part of a scintillator pack with an x-ray shield as described above with respect to FIG. 1.

The output from each photodetector diode is connected to an operational amplifier (not shown) which is mounted on the gantry. The output from each operational amplifier is connected either by individual wires 120 or by ot her electronics to the main control system 150 for the computed tomography system 100. In the illustrated embodiment, power for the x-ray source and signals from the scintillation detector are carried to the main control system 150 by a cable 130. The use of the cable 130 generally limits the gantry to a single full revolution before returning to its original position.

Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light which is detected by the photodetector diode and thereby converted to an electrical signal as a means of converting the incident x-rays to electrical signals which may be processed for image extraction and other purposes.

EXAMPLE 1

Figure 5:
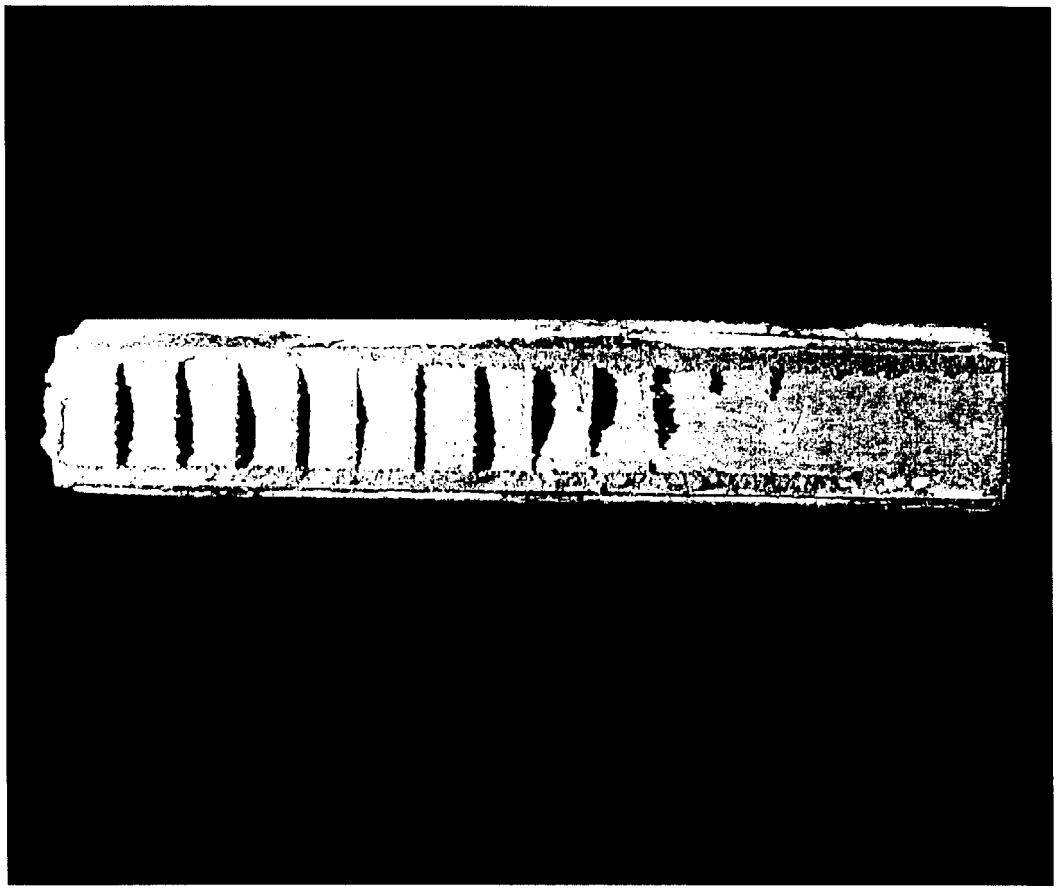
FIG. 5 is a photograph of an x-ray absorbing layer of tungsten filled epoxy formed over an inter-scintillator reflector in a scintillator array.

In this example, according to the embodiment of the invention of FIGS. 2a–2c, tungsten impregnated epoxy was used as an x-ray absorbing precursor material. A linear array of HiLight™ scintillator pixels approximately 2 mm thick (in the x-ray direction), 1.5 mm wide, and 2 mm deep was provided. The pixels were separated by 0.010 inches with a titania doped epoxy scintillation light reflecting layer. The array with reflecting layer was coated with a layer of 85% by weight tungsten filled Norland 61™ UV curable epoxy. The thickness of this epoxy layer was approximately 0.030 inches. The side of the array opposite the tungsten filled epoxy layer was exposed to 120 kVp x-rays for a total of 50 seconds amounting to a total absorbed dose of approximately 15,000 Rad in the tungsten/epoxy mixture. The tungsten filled layer was then washed with acetone, resulting in lines of cured tungsten filled composite above the scintillation light reflecting layer approximately 0.012 inches wide by 0.018 inches tall. The tungsten/epoxy composite lines are shown formed above the inter-scintillator reflector in the photograph of FIG. 5.

EXAMPLE 2

The conditions for this second example are similar to the first example. However, in this example the HiLight™ scintillator array had 0.004 inch reflector gaps between the pixels, with a 3 mm thick scintillator in the x-ray direction. The total exposure dose was again approximately 15,000 Rad. In this example a 1 hour elapsed time was allowed between the end of the x-ray exposure and washing with acetone to remove the unexposed epoxy, to allow the epoxy to cure more fully. This resulted in lines of cured tungsten/epoxy composite 0.006 inches wide by 0.004 inches thick.

The preferred embodiments have been set forth herein for the purpose of illustration. However, this description should not be deemed to be a limitation on the scope of the invention. Accordingly, various modifications, adaptations, and alternatives may occur to one skilled in the art without departing from the spirit and scope of the claimed inventive concept.

All of the texts which are mentioned above are incorporated herein by reference.

What is claimed is:

1. A scintillator pack comprising:
   an array of scintillator pixels;
   a scintillation light reflecting layer for reflecting scintillation light from the scintillator pixels, where the scintillation light reflecting layer is formed in inter-scintillator regions between the scintillator pixels; and
   an x-ray absorbing layer comprising a high density x-ray absorbing material formed selectively in a self aligned manner in first regions over the inter-scintillator regions.

2. The scintillator pack of claim 1, wherein the x-ray absorbing layer further comprises a dielectric, and wherein the high density x-ray absorbing material comprises particles interspersed in the dielectric.

3. The scintillator pack of claim 2, wherein the dielectric is an epoxy.

4. The scintillator pack of claim 1, wherein the high density x-ray absorbing material comprises a high density metal selected from the group consisting of hafnium, tantalum, tungsten, rhenium, platinum, gold, lead, and alloys thereof.

5. The scintillator pack of claim 1, wherein the high density x-ray absorbing material comprises a high density material selected from the group consisting of hafnium oxide, tungsten oxide, and lead oxide.

6. The scintillator pack of claim 2, wherein the high density x-ray absorbing material comprises a high density material selected from the group consisting of hafnium, tantalum, tungsten, rhenium, platinum, gold, lead, alloys thereof, hafnium oxide, tungsten oxide, and lead oxide.

7. The scintillator pack of claim 1, wherein the x-ray absorbing layer is between 0.0001 and 0.08 inches thick.

8. The scintillator pack of claim 1, wherein the x-ray absorbing layer is between 0.002 and 0.010 inches in width in the first regions.

9. The scintillator pack of claim 1, wherein the scintillation light reflection layer covers a top surface of the scintillator pixels.

10. A scintillator pack comprising:
    an array of scintillator pixels;
    a scintillation light reflecting layer for reflecting scintillation light from the scintillator pixels, where the scintillation light reflecting layer is formed in inter-scintillator regions between the scintillator pixels; and
    an x-ray absorbing layer comprising a high density x-ray absorbing material formed selectively in first regions over the inter-scintillator regions.

11. A method of forming a scintillator pack comprising:
    forming a scintillation light reflecting layer in inter-scintillator regions between scintillator pixels of an array of scintillator pixels;
    selectively forming an x-ray absorbing layer over the inter-scintillator regions.

12. The method of forming a scintillator pack of claim 11, wherein the selectively forming step further comprises:
    forming an x-ray absorbing precursor layer over the array of scintillator pixels and inter-scintillator regions;
    selectively exposing the x-ray absorbing precursor layer to radiation thereby forming first precursor regions selectively over and self aligned to the interscintillator regions, and second precursor regions between the first precursor regions; and
    removing the second precursor regions.

13. The method of forming a scintillator pack of claim 12, wherein the x-ray absorbing precursor layer is a radiation curable epoxy containing high density x-ray absorbing particles.

14. The method of forming a scintillator pack of claim 13, wherein the radiation in the selectively exposing step is one of x-ray and ultra-violet (UV) radiation.

15. The method of forming a scintillator pack of claim 12, wherein the selectively exposing step further comprises:
    selectively directing the radiation through the inter-scintillator regions.

16. The method of forming a scintillator pack of claim 15, wherein the x-ray absorbing precursor layer is a radiation curable epoxy containing high density x-ray absorbing particles, and wherein the radiation in the selectively exposing step is x-ray radiation.

17. The method of forming a scintillator pack of claim 16, wherein the high density x-ray absorbing particles comprise a high density material selected from the group consisting of hafnium, tantalum, tungsten, rhenium, platinum, gold, lead, alloys thereof, hafnium oxide, tungsten oxide, and lead oxide.

18. The method of forming a scintillator pack of claim 12, wherein the radiation is x-ray radiation, and the x-ray absorbing precursor layer includes an ultra-violet (UV) or blue emitting x-ray scintillator material.

19. The method of forming a scintillator pack of claim 18, wherein the UV emitting x-ray scintillator material is one of a cerium doped oxide, $Y_2O_3$, and $Gd_2O_3$.

20. The method of forming a scintillator pack of claim 11, wherein the selectively forming step further comprises:
    forming a photoresist layer over the array of scintillator pixels and inter-scintillator regions; and
    selectively exposing the photoresist layer to radiation thereby forming first resist regions selectively over the inter-scintillator regions, and second resist regions between the first resist regions.

21. The method of forming a scintillator pack of claim 20, wherein the selectively forming step further comprises:
    removing the first resist regions formed selectively over the interscintillator regions and leaving the second resist regions;
    forming an x-ray absorbing material over the second resist regions and the inter-scintillator regions; and
    removing the second resist regions to selectively form the x-ray absorbing layer over the inter-scintillator regions.

22. The method of forming a scintillator pack of claim 21, wherein the x-ray absorbing material is formed over the second resist regions and inter-scintillator regions by one of evaporation, sputtering, electroless plating, and chemical vapor deposition.

23. The method of forming a scintillator pack of claim 22, wherein the removing the second resist regions also removes x-ray absorbing material over the second resist region.

24. The method of forming a scintillator pack of claim 11, wherein selectively forming step further comprises:
   forming a photoresist layer over the array of scintillator pixels and inter-scintillator regions;
   selectively exposing the photoresist layer to radiation thereby forming first resist regions selectively over the inter-scintillator regions, and second resist regions between the first resist regions;
   removing the first resist regions and leaving the second resist regions;
   selectively depositing an x-ray absorbing material between the second resist regions; and
   removing the second resist regions to thereby selectively form the x-ray absorbing layer over the inter-scintillator regions.

25. The method of forming a scintillator pack of claim 11, wherein selectively forming step further comprises:
   forming a photoresist layer over the array of scintillator pixels and inter-scintillator regions;
   selectively exposing the photoresist layer to radiation thereby forming first resist regions selectively over the inter-scintillator regions, and second resist regions between the first resist regions;
   removing the first resist regions formed selectively over the interscintillator regions and leaving the second resist regions;
   forming a first layer of x-ray absorbing material over the second resist regions and the inter-scintillator regions by one of plating, chemical vapor deposition, sputtering, and evaporation;
   removing the second resist regions; and
   forming a second layer of x-ray absorbing material of x-ray absorbing material on the first layer of x-ray absorbing material by one of plating, sputtering, and soldering to thereby selectively form the x-ray absorbing layer over the inter-scintillator regions.

26. The method of forming a scintillator pack of claim 20, further comprising:
   forming an x-ray absorbing material over the inter-scintillator regions and the scintillator pixels prior to forming the photoresist layer;
   removing the second resist regions and leaving the first resist regions thereby selectively exposing third regions of the x-ray absorbing material;
   removing the third regions of the x-ray absorbing material thereby forming the x-ray absorbing layer; and
   removing the first resist regions.

27. The method of forming a scintillator pack of claim 26, wherein the x-ray absorbing material is formed by one of evaporation, sputtering, plating and chemical vapor deposition.

28. The method of forming a scintillator pack of claim 27, wherein the x-ray absorbing material comprises a high density material selected from the group consisting of hafnium, tantalum, tungsten, rhenium, platinum, gold, lead, alloys thereof, hafnium oxide, tungsten oxide, and lead oxide.

29. The method of forming a scintillator pack of claim 21, wherein the selectively exposing step further comprises:
   selectively directing the radiation through the inter-scintillator regions.

30. The method of forming a scintillator pack including an x-ray damage shield of claim 29, wherein the radiation in the selectively exposing step is x-ray radiation.

31. The method of forming a scintillator pack of claim 26, wherein the selectively exposing step further comprises:
   selectively directing the radiation through the inter-scintillator regions.

32. The method of forming a scintillator pack of claim 31, wherein the radiation in the selectively exposing step is x-ray radiation.

33. The method of forming a scintillator pack of claim 12, wherein the radiation is x-ray radiation, and the selectively forming step further comprises:
   providing an ultraviolet (UV) or blue emitting solid scintillator sheet above the x-ray absorbing precursor layer prior to selectively exposing the x-ray absorbing precursor layer to radiation.

34. The method of forming a scintillator pack of claim 11, wherein the selectively forming step further comprises:
   providing a screening mask with holes selectively aligned to the interscintillator regions;
   applying an x-ray absorbing curable ink in the holes selectively aligned to the interscintillator regions;
   curing the x-ray absorbing curable ink.

35. The method of forming a scintillator pack of claim 34, wherein the curing step comprises curing the x-ray absorbing curable ink by heating the x-ray absorbing curable ink or by illuminating the x-ray absorbing ink with blue, ultraviolet (UV) or x-ray radiation.

36. The method of forming a scintillator pack of claim 34, wherein the x-ray absorbing curable ink comprises a high density metal selected from the group consisting of hafnium, tantalum, tungsten, rhenium, platinum, gold, lead, and alloys thereof.

37. A computed tomography system comprising:
   an x-ray source;
   a scintillator pack including an array of scintillator pixels, a scintillation light reflecting layer formed in inter-scintillator regions between the scintillator pixels for reflecting scintillation light from the scintillator pixels upon an x-ray from the x-ray source impinging upon one of the scintillator pixels, and an x-ray absorbing layer comprising a high density x-ray absorbing material formed selectively in a self aligned manner in first region over the inter-scintillator regions; and
   a scintillation light detector optically coupled to the solid scintillator material for detecting the scintillation radiation.

38. A scintillator pack comprising:
   an array of scintillator pixels;
   a scintillation light reflecting layer for reflecting scintillation light from the scintillator pixels, where the scintillation light reflecting layer is formed in inter-scintillator regions between the scintillator pixels; and
   an alignment layer formed selectively in a self aligned manner in first regions over the inter-scintillator regions.

39. The scintillator pack of claim 38, further comprising:
   an x-ray protection shield formed over and aligned to the alignment layer.

40. The scintillator pack of claim 39, wherein the x-ray protection shield comprises wires or plates.

41. A method of forming a scintillator pack comprising:
   forming a scintillation light reflecting layer in inter-scintillator regions between scintillator pixels of an array of scintillator pixels; and
   selectively forming an alignment layer over the inter-scintillator regions.

42. The method of forming a scintillator pack of claim 41, wherein the selectively forming step further comprises:

forming a radiation curable layer over the array of scintillator pixels and inter-scintillator regions;

selectively exposing the radiation curable layer to radiation thereby forming first regions selectively over and self aligned to the interscintillator regions, and second regions between the first regions; and removing the second regions.

43. The method of forming a scintillator pack of claim 41, further comprising:

forming an x-ray protection shield over and aligned to the alignment layer.

44. The method of forming a scintillator pack of claim 43, wherein the selectively forming step further comprises:

forming a radiation curable layer over the array of scintillator pixels and inter-scintillator regions;

selectively exposing the radiation curable layer to radiation thereby forming first regions selectively over and self aligned to the interscintillator regions, and second regions between the first regions; and removing the second regions.

45. The method of forming a scintillator pack of claim 44, wherein the radiation is one of x-ray, ultraviolet (UV) and blue radiation.

46. The method of forming a scintillator pack of claim 44, wherein the radiation curable layer is one of a photoresist layer, a radiation curable epoxy, and a radiation curable ink.

47. The method of forming a scintillator pack of claim 45, wherein the radiation is x-ray radiation and the radiation curable layer includes a UV or blue emitting x-ray scintillator.

48. The method of forming a scintillator pack of claim 44, where in the selectively exposing step, the radiation is selectively directed through the interscintillator regions.

* * * * *